United States Patent
Pao et al.

(10) Patent No.: US 10,555,197 B2
(45) Date of Patent: Feb. 4, 2020

(54) METHOD OF CONTROLLING WLAN MEASUREMENT REPORT AND RELATED APPARATUS USING THE SAME

(71) Applicant: Acer Incorporated, New Taipei (TW)

(72) Inventors: Wei-Chen Pao, New Taipei (TW); Jung-Mao Lin, New Taipei (TW)

(73) Assignee: Acer Incorporated, New Taipei (TW)

( * ) Notice: Subject to any disclaimer, the term of this patent is extended or adjusted under 35 U.S.C. 154(b) by 106 days.

(21) Appl. No.: 15/225,233

(22) Filed: Aug. 1, 2016

(65) Prior Publication Data

US 2017/0048737 A1   Feb. 16, 2017

Related U.S. Application Data

(60) Provisional application No. 62/203,925, filed on Aug. 12, 2015.

(51) Int. Cl.
  *H04W 24/10*  (2009.01)
  *H04L 5/00*  (2006.01)
  *H04W 84/12*  (2009.01)

(52) U.S. Cl.
  CPC ............ *H04W 24/10* (2013.01); *H04L 5/006* (2013.01); *H04W 84/12* (2013.01)

(58) Field of Classification Search
  None
  See application file for complete search history.

(56) References Cited

U.S. PATENT DOCUMENTS

| 2008/0181187 A1* | 7/2008 | Scott | H04W 48/18 370/338 |
| 2012/0004010 A1* | 1/2012 | Tamura | H04W 24/10 455/525 |

(Continued)

FOREIGN PATENT DOCUMENTS

| EP | 2983408 A1 | 2/2016 |
| WO | 2014148969 | 9/2014 |

(Continued)

OTHER PUBLICATIONS

"New WI Proposal: LTE-WLAN Radio Level Integration and Interworking Enhancement," 3GPP TSG RAN Meeting #67 RP-150510, Shanghai, China, Mar. 9-12, 2015, pp. 1-9.

(Continued)

*Primary Examiner* — Otis L Thompson, Jr.
(74) *Attorney, Agent, or Firm* — J.C. Patents

(57) ABSTRACT

The present disclosure proposes a method of controlling a WLAN measurement report and related apparatuses using the same. According to one of the exemplary embodiments, the proposed method includes not limited to receiving a configuration message; determining whether to transmit a WLAN measurement result by checking a set of rules after receiving configuration message; generating a WLAN measurement report comprising the WLAN measurement result and transmitting a response message comprising the WLAN measurement report in response to having determined to transmit the WLAN measurement result based on the set of rules; and omitting the WLAN measurement result in the WLAN measurement report in response to having determined to not transmit the WLAN measurement result based on the set of rules.

16 Claims, 11 Drawing Sheets

(56) References Cited

U.S. PATENT DOCUMENTS

| | | | |
|---|---|---|---|
| 2012/0039197 A1* | 2/2012 | Jang | H04W 36/30 370/252 |
| 2012/0213162 A1* | 8/2012 | Koo | H04W 16/14 370/329 |
| 2014/0161103 A1* | 6/2014 | Sirotkin | H04W 24/10 370/332 |
| 2014/0204924 A1* | 7/2014 | Ryu | H04W 40/246 370/338 |
| 2015/0003254 A1* | 1/2015 | Sasaki | H04W 28/08 370/237 |
| 2015/0043560 A1 | 2/2015 | Guo et al. | |
| 2015/0065163 A1* | 3/2015 | Murakami | H04W 64/00 455/456.1 |
| 2015/0223117 A1* | 8/2015 | Jha | H04W 36/0016 455/436 |
| 2015/0341830 A1* | 11/2015 | Jeong | H04W 24/02 370/329 |
| 2016/0044555 A1* | 2/2016 | Liang | H04W 36/14 370/331 |
| 2016/0242078 A1* | 8/2016 | Teyeb | H04W 36/0016 |
| 2016/0269985 A1* | 9/2016 | Bergstrom | H04W 76/10 |
| 2016/0277974 A1* | 9/2016 | Persson | H04W 48/16 |
| 2016/0302136 A1* | 10/2016 | Bergstrom | H04W 48/00 |
| 2016/0330660 A1* | 11/2016 | Wong | H04B 17/318 |
| 2017/0086143 A1* | 3/2017 | Pike | H04W 52/50 |
| 2017/0127306 A1* | 5/2017 | Tan Bergstrom | H04W 24/10 |
| 2017/0150384 A1* | 5/2017 | Rune | H04W 24/10 |
| 2017/0318569 A1* | 11/2017 | Dinan | H04W 72/0406 |
| 2017/0339610 A1* | 11/2017 | Wong | H04W 36/30 |
| 2018/0020383 A1* | 1/2018 | Sirotkin | H04W 24/10 |
| 2018/0192346 A1* | 7/2018 | Nagasaka | H04W 28/08 |
| 2018/0242193 A1* | 8/2018 | Teyeb | H04W 76/20 |
| 2018/0288637 A1* | 10/2018 | Laselva | H04W 76/28 |
| 2019/0182866 A1* | 6/2019 | Li | H04W 72/121 |

FOREIGN PATENT DOCUMENTS

| | | |
|---|---|---|
| WO | 2014162905 | 10/2014 |
| WO | 2015016138 | 2/2015 |

OTHER PUBLICATIONS

"Report of 3GPP TSG RAN WG2 meeting #90," 3GPP TSG-RAN Working Group 2 meeting #91, R2-153060, Beijing, china, Aug. 24-28, 2015, pp. 1-147.
"Requirement for layer 2 structure in LTE-WLAN aggregation," 3GPP TSG-RAN WG2 Meeting #89b, R2-151435, Bratislava, Slovakia, Apr. 20-24, 2015, pp. 1-3.
"Reply Liaison on WLAN signal measurements for WLAN/3GPP Radio interworking," 3GPP TSG RAN WG2 Meeting #86, R2-142731, Seoul, Republic of Korea, May 19-23, 2014, pp. 1-3.
"3rd Generation Partnership Project; Technical Specification Group Services and System Aspects; IP flow mobility and seamless Wireless Local Area Network (WLAN) offload; Stage 2 (Release 12)," 3GPP TS 23.261 V12.0.0, Sep. 2014, pp. 1-22.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP Ts 36300 V13.0.0, Jun. 2015, pp. 1-254.
"3rd Generation Partnership Project; Technical Specification Group Services and System Aspects; Network based IP Flow mobility (Release 13)," 3GPP TR 23.861 V13.0.0, Jun. 2015, pp. 1-152.
"Further discussion on WLAN interworking for Rel-13," 3GPP TSG-RAN WG2 #90, Tdoc R2-152473, Fukuoka, Japan, Apr. 25-29, 2015, pp. 1-2.
"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36331 V12.6.0, Jun. 2015, pp. 1-449.
"Control plane protocol architecture for LTE-WLAN integration," 3GPP TSG-RAN WG2 Meeting #90, R2-152103, Fukuoka, Japan, May 25-29, 2015, pp. 1-4.
"WLAN Reliability with LTE+WLAN Aggregation in LTE R13," 3GPP TSG-RAN WG2 #90, Tdoc R2-152563, Fukuoka, Japan, May 25-29, 2015, pp. 1-3.
"Considerations of user preference on LTE-WLAN interworking / aggregation," 3GPP TSG-RAN WG2 Meeting #89bis, R2-152339, Fukuoka, Japan, May 25-29, 2015, pp. 1-5.
"Discussion on WLAN AP selection," 3GPP TSG RAN WG2 Meeting #90, R2-152124, Fukuoka, Japan, May 25-29, 2015, pp. 1-3.
"AP selection for LTE WLAN aggregation," 3GPP TSG-RAN WG2 Meeting #90, R2-152654, Fukuoka, Japan, May 25-29, 2015, pp. 1-2.
"User preference aspects of WLAN aggregation and interworking," 3GPP TSG-RAN WG2 Meeting #90, R2-152590, Fukuoka, Japan, May 25-29, 2015, pp. 1-3.
Itri, "Limited reporting of WLAN measurement results," 3GPP TSG RAN WG2 #91bis, R2-154400, Oct. 5-9, 2015, pp. 1-3.
Itri, "Consideration of user preference," 3GPP TSG-RAN WG2 #91, R2-153430, Aug. 24-28, 2015, pp. 1-2.
Nokia Networks, "LTE-WLAN radio interworking improvements," 3GPP TSG-RAN WG2 Meeting #89bis, R2-151270, Apr. 20-24, 2015, pp. 1-4.
Huawei et al., "LTE-WLAN interworking enhancement," 3GPP TSG-RAN WG2 Meeting #89bis, R2-151572, Apr. 20-24, 2015, pp. 1-7.
Qualcomm Incorporated et al., "WLAN Selection and Mobility," 3GPP TSG-RAN WG2 Meeting #90, R2-152739, May 25-29, 2015, pp. 1-6.
Nokia Networks,"LTE-WLAN radio interworking improvements", 3GPP TSG-RAN WG2 Meeting #89bis, R2-151270,Apr. 20-24, 2015,pp. 1-2.

* cited by examiner

US 10,555,197 B2

METHOD OF CONTROLLING WLAN MEASUREMENT REPORT AND RELATED APPARATUS USING THE SAME

CROSS REFERENCE TO RELATED APPLICATION

This application claims the priority benefit of U.S. provisional application Ser. No. 62/203,925, filed on Aug. 12, 2015. The entirety of the above-mentioned patent application is hereby incorporated by reference herein and made a part of specification.

TECHNICAL FIELD

The present disclosure is directed to a method of controlling a wireless local area network (WLAN) measurement report and related apparatuses using the same.

BACKGROUND

Recently, interworking between 3GPP and WLAN as proposed by 3GPP Release-12 aims to enhance core network based WLAN offloading so as to improve user quality of experience (QoE), increase network utilization, and provide more controls for network operators. These improvements, as characterized by 3GPP RP-150510 for example, may further be enhanced by aggregating a Long Term Evolution (LTE) communication system with WLAN as well as even further inter-working enhancements between LTE and WLAN which are relevant to both co-located and non-co-located deployment scenarios.

FIG. 1 illustrates a communication system 100 in which a LTE communication system interworks with a WLAN. The communication system 100 includes not limited to a LTE eNB 101, a WLAN termination node 102 having a wireless WLAN radio coverage 104, and a user equipment (UE) 103. The WLAN termination node (WTN) 102 may further include not limited to one or multiple access points (APs). The UE 103 could be a multiple connection capable UE which is capable of connecting to different radio access technologies such as LTE, WLAN, and so forth. The UE 103 may initiate a WLAN measurement and subsequently generating a WLAN measurement report. The eNB 101 may configure the UE 103 for performing a WLAN measurement, and such configuration may include not limited to frequency for performing WLAN measurement, a WLAN channel, a WLAN identifier, and so forth.

The wireless service to the UE 103 by the eNB 101 as well as by the aforementioned group of APs as the result of the mobility of the UE 103 could be controlled by the eNB 101, and such control could be implemented in response to receiving measurement report of WLAN 102 from the UE 103 as previously proposed in 3GPP RAN2#90. By implementing network-controlled WLAN selection, the eNB 101 would still be in full control of the AP selection and WLAN mobility, and thus the eNB 101 would control AP selections, AP removals and AP additions based on the received WLAN measurement reports which are configured for the serving and the neighbor APs for each target WLAN channel. Such eNB 101 control could be suspended or interrupted by user preference such as by switching off the WLAN modem, the interruption of the WLAN network, and so forth. Consequently, a network may need to consider user preference under the circumstance when the eNB 101 has full control of the AP selection and WLAN mobility of the UE 103. Failing to consider user preference could potentially be problematic.

To elucidate in further detail, an example is provided. Suppose that an eNB initiates the aggregation or interworking between the LTE and WLAN or interworking based on a measurement report from an UE. The UE may then perform a connection with a WLAN termination node after the UE receives a command from the eNB or the network (i.e., Network-Controlled WLAN mobility). The command from the eNB may include not limited to a steering command (e.g. R13 LTE+WLAN interworking enhancement) and aggregation configuration (e.g. R13 LTE+WLAN aggregation). However, the UE may not be able to comply with the eNB's command or could fail to connect or establish with the WLAN termination node because of circumstances such as the WLAN module being occupied, the result of a user preference or action, current condition of the WLAN, and etc. Since certain user preferences or actions could make the aggregation or interworking impossible when requested by the network, the circumstance under which the UE does not permit use of the WLAN although commanded from the network may need to be considered.

SUMMARY OF THE DISCLOSURE

Accordingly, the present disclosure is directed to a method of controlling a WLAN measurement report and related apparatuses using the same.

In one of the exemplary embodiments, the present disclosure is directed to a method of controlling a WLAN measurement report applicable to a user equipment. The method would include not limited to: receiving a configuration message; determining whether to transmit a WLAN measurement result by checking a set of rules after receiving configuration message; generating a WLAN measurement report comprising the WLAN measurement result and transmitting a response message comprising the WLAN measurement report in response to having determined to transmit the WLAN measurement result based on the set of rules; and omitting the WLAN measurement result in the WLAN measurement report in response to having determined to not transmit the WLAN measurement result based on the set of rules.

In one of the exemplary embodiment, the present disclosure is directed to a user equipment which includes not limited to a transmitter, a receiver, and a processor coupled to the transmitter and the receiver. The processor is configured at least for: receiving, via the receiver, a configuration message; determining whether to transmit a WLAN measurement result by checking a set of rules after receiving configuration message; generating a WLAN measurement report comprising the WLAN measurement result and transmitting, via the transmitter, a response message comprising the WLAN measurement report in response to having determined to transmit the WLAN measurement result based on the set of rules; and omitting the WLAN measurement result in the WLAN measurement report in response to having determined to not transmit the WLAN measurement result based on the set of rules.

In one of the exemplary embodiments, the present disclosure is directed to a method of controlling a WLAN measurement report applicable to a base station. The method would include not limited to: transmitting a configuration message; receiving a response message comprising a WLAN measurement report which is based on checking a set of rules after transmitting the configuration message;

determining whether to integrate a WLAN which corresponds to the WLAN measurement report in response to receiving the response message; and transmitting a command message in response to having determined to integrate the WLAN.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
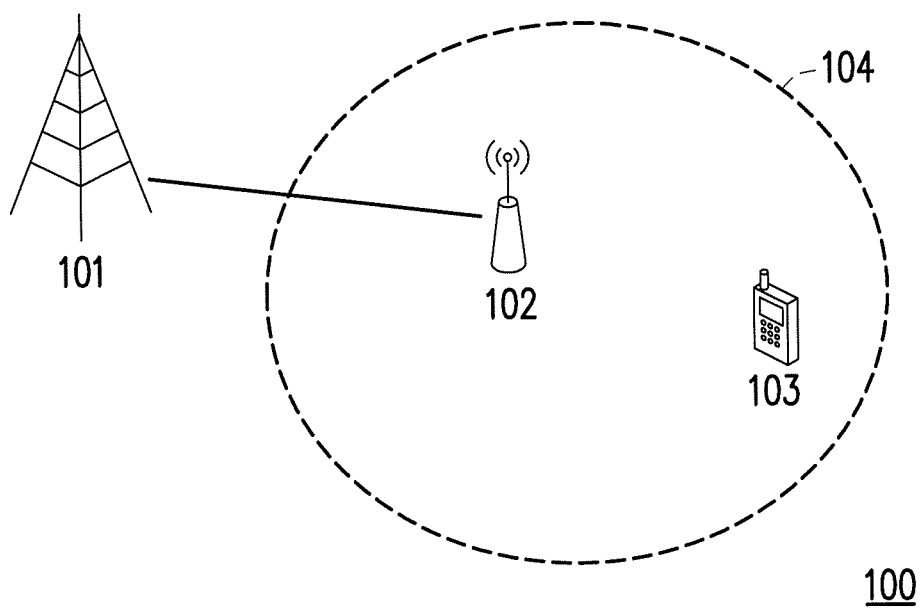
FIG. 1 illustrates a communication system 100 in which a LTE communication system interworks with a WLAN.

Reference will now be made in detail to the present exemplary embodiments of the disclosure, examples of which are illustrated in the accompanying drawings. Wherever possible, the same reference numbers are used in the drawings and the description to refer to the same or like parts.

As previously described, the current communication system which aggregates 3GPP and WLAN may not have adequately taken user preference into account when a base station takes full control of providing wireless services to a roaming UE. More specifically, such communication system may not be equipped to handle the circumstance in which a UE does not permit the use of a WLAN even though the UE is under the command from the 3GPP network to do so. Thus, the disclosure proposes a method of controlling a WLAN measurement report and related apparatuses using the same.

The disclosure aims to avoid the unapplied signaling for multiple connections. For example, one or multiple commands from a network to provide a UE aggregated LTE and WLAN wireless services could be avoided when it is impossible or impractical for a UE to connect to both LTE and WLAN connections. The disclosure aims to allow an eNB to configure or reconfigure a UE if or only if the UE is capable of connecting to both a LTE eNB and a WLAN node. Under such, for example, WLAN measurement results may not be included in a measurement report. Also, the disclosure aims to consider user preference in a measurement report, by allowing, for example, the user preference to take precedence. Further, the disclosure aims to allow an eNB to obtain more information as for why a UE has been unable to comply with a command from a network. The cause could be related to, for example, conflicts resulted from user preference or WLAN module being occupied.

Figure 2A:
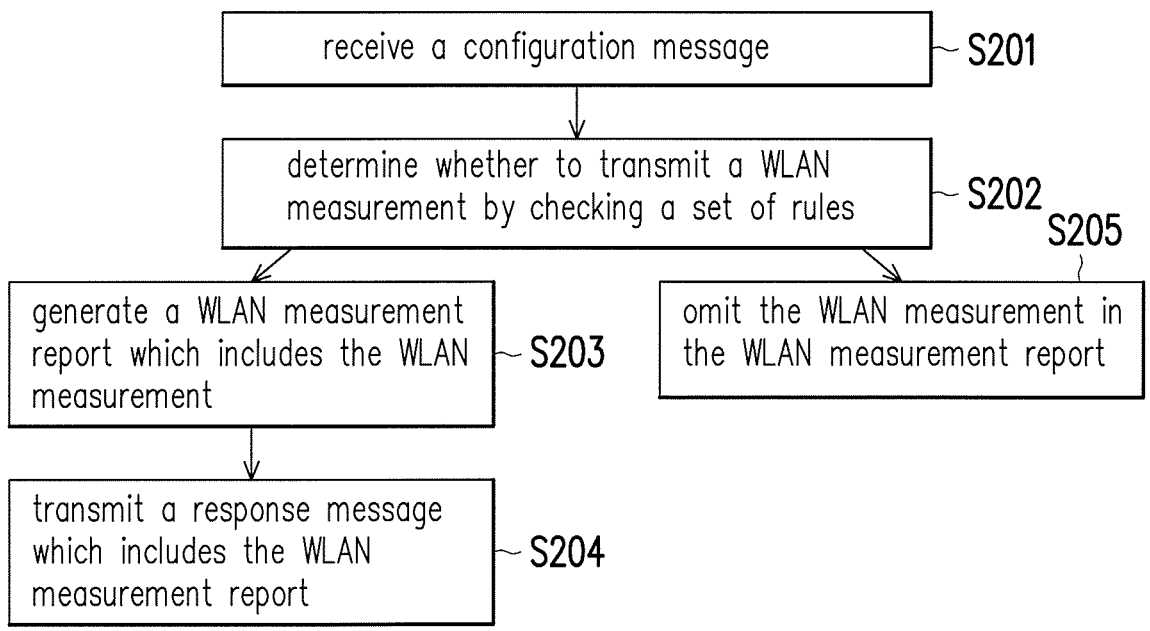
FIG. 2A is a flow chart which illustrates the proposed method of controlling a wireless local area network (WLAN) measurement report from the perspective of a user equipment in accordance with one of the exemplary embodiment of the disclosure.

FIG. 2A is a flow chart which illustrates the proposed method of controlling a WLAN measurement report from the perspective of a user equipment (UE) in accordance with one of the exemplary embodiment of the disclosure. In step S201, the UE would receive a configuration message. In step S202, the UE would determine whether to transmit a WLAN measurement result by checking a set of rules. In step S203, the UE would generate a WLAN measurement report which includes the WLAN measurement in response to having determined to transmit the WLAN measurement result based on the set of rules. In step S204, the UE would also transmit a response message which includes the WLAN measurement report in response to having determined to transmit the WLAN measurement result based on the set of rules. In step S205, the UE would omit the WLAN measurement result in the WLAN measurement report in response to having determined to not transmit the WLAN measurement result based on the set of rules.

In one of the exemplary embodiments, the configuration message could be a RRCConnectionReconfiguration message transmitted from an eNB to the UE. The configuration message may provide, update, or modify the set of rules. The configuration message may also provide various parameters and thresholds for the set of rules.

In one of the exemplary embodiments, the set of rules is intrinsic to the UE. However; the set of rules could also be received externally from the eNB.

In one of the exemplary embodiments, the set of rules may include multiple cases or rules for which, if met, would absolve the UE from transmitting one or more WLAN measurement results to the eNB. The cases or rules include not limited to a user preference setting restrains using a WLAN which corresponds to the WLAN measurement report, a WLAN module of the user equipment is unavailable, UE is mobile within an access point (AP) list, a loading of an access point (AP) of a WLAN which corresponds to the WLAN measurement report exceeds a predefined threshold, a received signal strength indicator (RSSI) of beacon or other frames of an access point (AP) within an AP list exceeds a predefined threshold, and so forth.

In one of the exemplary embodiments, the set of rules may include multiple cases or rules for which, if met, would require the UE from transmitting one or more WLAN measurement results to the eNB. The cases or rules include not limited to a candidate access point (AP) is not within an AP list, a loading of an access point (AP) of a WLAN which corresponds to the WLAN measurement report is less than a predefined threshold, a received signal strength indicator (RSSI) of an access point (AP) within an AP list is less than a predefined threshold, and etc.

In one of the exemplary embodiments, a cause of omitting a WLAN measurement result in the WLAN measurement report.

In one of the exemplary embodiments, the configuration message comprises an identifier (ID) of an access point of a WLAN which corresponds to the WLAN measurement report.

Figure 2B:
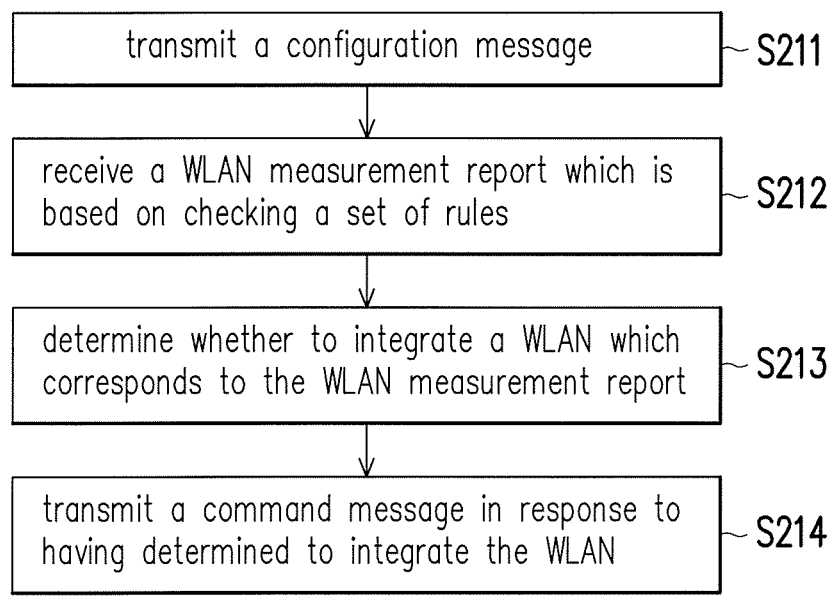
FIG. 2B is a flow chart which illustrates the proposed method of controlling a wireless local area network (WLAN) measurement report from the perspective of a base station in accordance with one of the exemplary embodiment of the disclosure.

FIG. 2B is a flow chart which illustrates the proposed method of controlling a WLAN measurement report from the perspective of a base station in accordance with one of the exemplary embodiment of the disclosure. In step S211, the base station would transmit a configuration message. In step S212, the base station would receive a WLAN measurement report which is based on checking a set of rules. In step S213, the base station would determine whether to integrate a WLAN which corresponds to the WLAN measurement repot. In step S214, the base station would transmit a command message in response to having determined to integrate the WLAN.

Figure 2C:
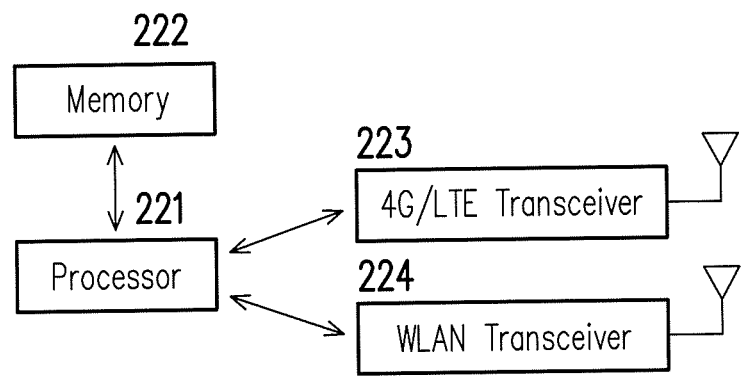
FIG. 2C illustrates the hardware of a user equipment in terms of functional block diagram in accordance with one of the exemplary embodiment of the disclosure.

FIG. 2C illustrates the hardware of a user equipment in terms of functional block diagram in accordance with one of the exemplary embodiment of the disclosure. The hardware of the exemplary user equipment would include not limited to a processor 221 electrically connected to a storage medium 222 (memory device), a 4G/LTE transceiver 223, and a WLAN transceiver 224. The processor is configured for executing functions related to the method of controlling WLAN measurement report as described in FIG. 2A as well as some or all subsequently described embodiments. The functions of the processor 221 could be implemented by using one or more programmable units such as a micro-processor, a micro-controller, a DSP chips, FPGA, etc. The functions of the processor 221 may also be implemented with separate electronic devices or ICs, and the functions performed by the processor 221 may be implemented within the domain of either hardware or software. The storage medium 222 could be a flash drive, a hard disk drive, or any storage drives that may provide temporary or permanent storages. The 4G/LTE transceiver 223 may contains an integrated or separate transmitter and receiver tuned to a licensed radio spectrum so as to communicate by following a standard protocol as defined by 3G, 4G, LTE, Wi-Max, and etc. The WLAN transceiver 224 may also contain an integrated or separate transmitter and receiver to transmit and receive through an unlicensed spectrum in which a WLAN operates.

Figure 2D:
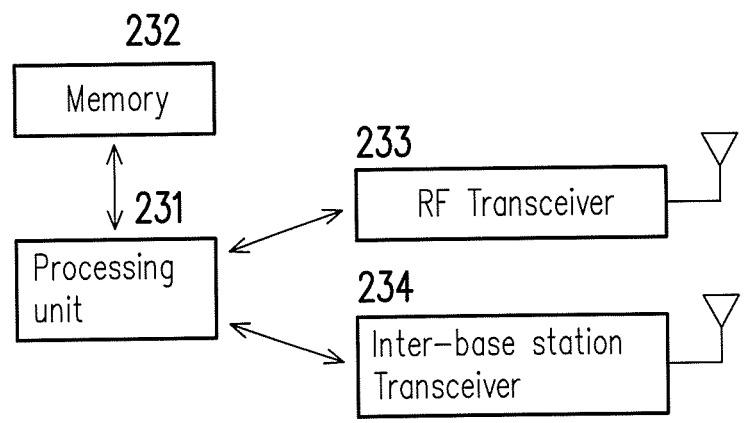
FIG. 2D illustrates the hardware of a base station in terms of functional block diagram in accordance with one of the exemplary embodiment of the disclosure.

FIG. 2D illustrates the hardware of a base station in terms of functional block diagram in accordance with one of the exemplary embodiment of the disclosure. The hardware of the exemplary base station may include not limited to a processor 231 electrically connected to a storage medium 232 (memory device), a RF transceiver 233, and an inter-base station transceiver 234. The processor 231 is configured for executing functions related to the method of controlling WLAN measurement report as described in FIG. 2B as well as some or all subsequently described embodiments. The functions of the processing unit 231 could be implemented by using one or more programmable units such as a micro-processor, a micro-controller, a DSP chips, FPGA, etc. The functions of the processing unit 231 may also be implemented with separate electronic devices or ICs, and the functions performed by the processing unit 231 may be implemented within the domain of either hardware or software. The storage medium 232 could be a flash drive, a hard disk drive, or any storage drives that may provide temporary or permanent storages. The RF transceiver 702 contains at least a transmitter and a receiver tuned to a licensed radio spectrum so as to communicate by following a standard protocol as defined by 3G, 4G, LTE, Wi-Max, and etc. The Inter-base station transceiver 234 may contain one or more transceiver at least for communicating with another eNB base station or for communicating with a small base station or AP operating under the domain of a WLAN.

The disclosure proposes using a set of rules or cases when a UE performs WLAN measurement reporting for some or all of the exemplary embodiments of the disclosure, and the set of rules would include multiple rules or cases in which some or all WLAN measurement results are not reported to the serving eNB or network. A case could also be thought of as an event or a rule, and thus the term "case", "rule", and "event" could be synonymous. For instance, if a measurement report is event triggered, then a case could be considered as an event. For another instance, if a measurement report is periodically generated and transmitted, then a case would involve checking whether or not WLAN results have been included in such measurement reports. Under the circumstance when a WLAN measurement result is not received by a base station, a cause could also be included in a measure report to indicate the reason why a WLAN measurement result has not been included.

In general, upon received a configuration message to commence a WLAN measurement of a particular AP, a UE would check a set of rules or cases to determine whether to transmit the WLAN measurement result of the particular AP to a base station from which the configuration message is received from. These cases are stated as follows.

Case 1: User preference setting of the UE restrains the use of the WLAN.
Case 2: WLAN module of the UE is unavailable or occupied by other features.
Case 3: The mobility of the UE is handled by one or more APs within an AP list given by an eNB.
Case 4: The load of the serving AP has changed and is over a predetermined threshold (i.e. overloaded).
Case 5: The parameter 'BeaconRSSI' of an AP list is over a predetermined threshold (RSSI=received signal strength indicator).
Case 6: The UE mobility state or speed is over a predetermined threshold.
Case 7: The UE does not carry offloadable traffic.
Case 8: At least one of WLAN measurement results does not exceed a predetermined threshold or value and thus does satisfy the condition to trigger a measurement report.
Case 9: The quality of service (QoS) classification (e.g. access category class, type of service as described in 3GPP R2-151435) does not matched a pre-defined value.
Case 10: Other situations, such as considerations of a higher layer or of a layer in the access stratum (AS), non-access stratum (NAS), or application, which considers feature of access network discovery and selection function (ANDSF), in-device coexistence (IDC) interference.

The set of rules of WLAN measurement reporting could be explicitly configured by the network or implicitly pre-configured in UE. Each WLAN measurement result could be associated with a specific WLAN identifier (ID) or other means to identify the specific WLAN AP. WLAN measurement results of some WLAN IDs or WLAN APs could be limited or may not be reported to a serving eNB or network when considering the aforementioned cases. WLAN measurement results may include not limited to BeaconRSSI, RSSI, DL/UL backhaul rate, estimated throughput, and 802.11 metrics (as described in 3GPP R2-142731). The 802.11 metrics may include received channel power indicator (RCPI), received signal to noise indicator (RSNI), average noise power indicator (ANPI), Channel Load, Basic Service Set Identifier (SSID), basic service set (BSS) Load, BSS Avg Access Delay, BSS Access Controller (AC) Access Delay, BSS Available Admission Capacity, Noise Histogram, Tx/Rx Frame Count, QOS Tx/Rx Frame Count, frame check sequence (FCS) Error Count, Retry Count, Retry a MAC service data unit (AMSDU) Count, Supported Operating Classes, BSS Description, Roaming Consortium, network access identifier (NAI) Realm, 3GPP Cell Network, Capability Lists, wide area network (WAN) Metrics, and station (STA) Capabilities.

The eNB or network may enable and may provide one or more cases to an UE through explicit signaling, or the UE could be pre-configured implicitly with one or more cases. The UE may apply one or more cases according to certain conditions (e.g. as defined by a 3GPP release or feature). Upon certain conditions being determined, the UE may check whether the one or more cases would be applicable. For WLAN measurement report which is event triggered, the cases could be used as events. For WLAN measurement report which is periodically generated and transmitted, cases could be used to check whether or not partial or all WLAN measurement results should be included in measurement report. A cause may be included in a WLAN measurement report to indicate the reason why WLAN measurement result has not been included. An eNB or network may configure a long measurement reporting period or a report interval to the UE when receiving from the UE an indication that the WLAN measurement result is not included in the WLAN measurement report. Otherwise, the eNB or the network may configure a short measurement reporting period to the UE. In another example, the eNB or network may configure both long and short measurement reporting periods to UE, and the UE may apply either the long or short measurement reporting period according to the aforementioned cases for WLAN measurement reporting.

For example, as an eNB acknowledges that a specific UE supports 3GPP LTE/WLAN radio interworking or 3GPP LTE/WLAN radio interworking enhancement, the eNB may enable case 7 for the specific UE to follow the rule. In general, network traffic could be a plurality of granularity or level, e.g., radio bearer, Packet Data Network (PDN), Access Point Name (APN), IP flow, and etc.

For example, when considering offloadable traffic (Case 7), Local Operating Environment Information may be considered (as described in 3GPP TS 23.261 for example). The Location Operation Environment Information is a set of implementation specific parameters which describe the local environment in which the UE is operating. In addition to operator policy and user preferences, the UE may take into account the Local Operating Environment Information when deciding which access to use for an IP flow. The actual Local Operating Environment Information is implementation dependent and may include items not limited to radio environment information, quality of IP connection, application specific requirements, power considerations, and etc.

For example, for offloadable traffic and granularity (Case 7) as in 3GPP RAN R12 for example, the traffic steering could done with PDN-granularity. Under such a MME may indicates to the UE which traffic on PDN-connection level is "offloadable" (i.e., can be steered to WLAN) and which traffic should be kept in LTE by using NAS signaling. As described in 3GPP SA R13 for example, Network Based IP Flow Mobility (NBIFOM) rules, which can be sent to the UE from PDN gateway, may support granularities down to IP-flow level as described in 3GPP R2-152473 for example.

Some embodiments of the disclosure may also use the following set of rules or cases for WLAN measurement reporting The following set of rules or cases may include not limited to cases for which partial or all WLAN measurement results must be reported to an eNB or network:
Case 1: User preference of a UE does not restrain the use of WLAN.
Case 2: WLAN module of a UE is not occupied by other features.
Case 3: The mobility of the UE cannot be handled by APs within an AP list given by an eNB. For example, a candidate AP which is preferred by the UE could be out of the AP list. Or as the eNB configures an AP list for a UE, according to the mapping of the AP list and scanned AP ID, UE will understand that the candidate or preferred AP is out of the AP list.
Case 4: AP load is changed and less a threshold (i.e. under loaded).
Case 5: BeaconRSSI of an AP list is less a threshold such as during updating of the AP list.
Case 6: Ping-pong problem has occurred. For example, an UE may swing within a group of APs if eNB-control is not introduced. Even if eNB-control has been implemented, the UE may trigger measurement reports and eNB may have a corresponding command or configuration for crossing groups of APs. In response to such circumstance, the UE may explicitly send an indication to inform the eNB of the ping-pong problem in order to update the AP list.

Figure 3A:
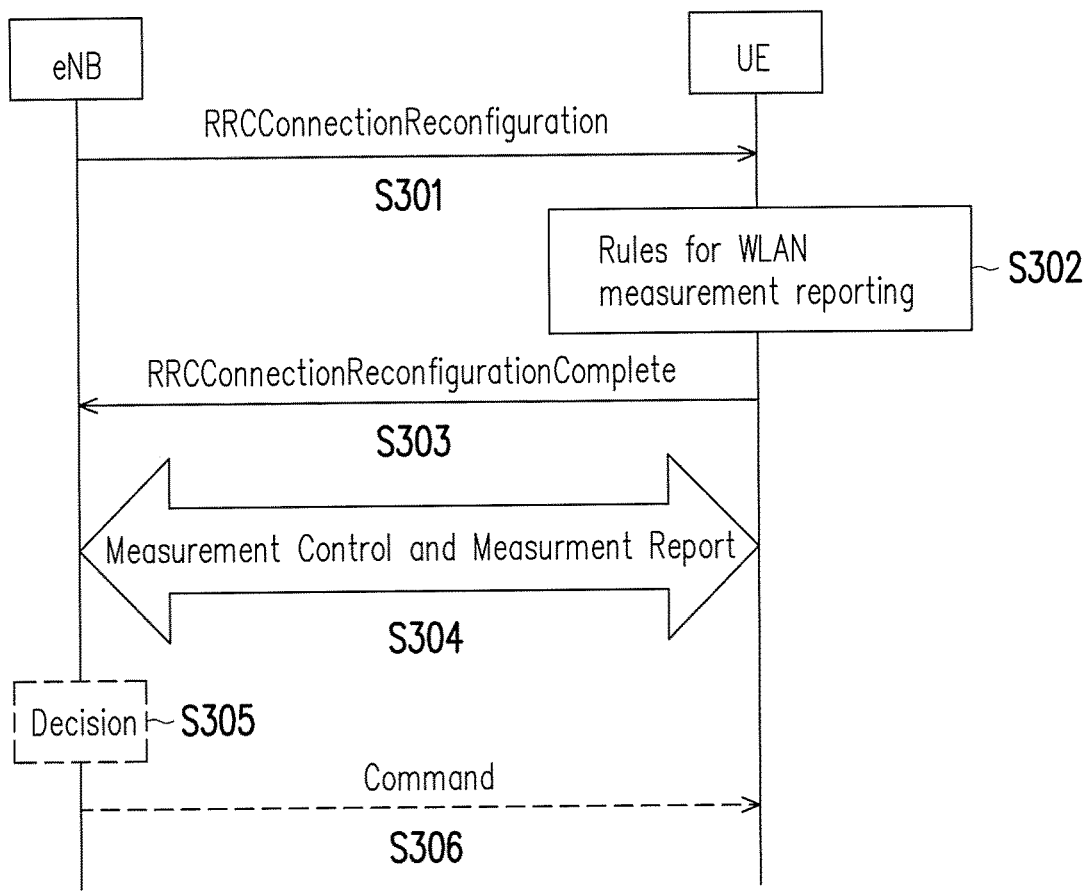
FIG. 3A illustrates a method of controlling a WLAN measurement report applicable to an ENB and a UE in accordance with one of the exemplary embodiments of the disclosure.

FIG. 3A~FIG. 10 expand upon the aforementioned concept with further details. FIG. 3A illustrates a method of controlling a WLAN measurement report applicable to an eNB and a UE in accordance with one of the exemplary embodiments of the disclosure. In step S301, an eNB would transmit a modified RRCConnectionReconfiguration message to a UE. The eNB first determines whether the UE would transmit WLAN measurement results of a particular AP by considering the situation of the UE. The control to have the UE transmit or not transmit such WLAN measurement result is accomplished through the modified RRCConnectionReconfiguration message, which may also include information of the set of rules used by the UE to determine whether to subsequently transmit the requested WLAN measurement results to the eNB or information to update the set of rules. The RRCConnectionReconfiguration message may also contain parameters and thresholds used by the set of rules. In step S302, the UE would apply the set of rules to determine whether to subsequently perform WLAN measurement or transmit the requested WLAN measurement results to the eNB. In one exemplary embodiment, the set of rules could be pre-programmed or pre-configured in the UE. Alternatively, the set of rules may also be transmitted from the eNB to the UE through the RRCConnectionReconfiguration message or another explicit signaling. In step S303, the UE would transmit to the eNB the RRCConnectionReconfigurationComplete message which may indicate whether the UE has received the request for the WLAN measurements or rules for WLAN measurement reporting or updates to the set of rules of WLAN measurement reporting. In step S304, the UE may conduct the requested WLAN measurements of the particular AP and subsequently transmit the WLAN measurement results in a WLAN measurement report to the eNB. In step S305, the eNB would make a decision to transmit or not transmit a subsequent command to the UE for LTE and WLAN integration, aggregation or interworking based on the received WLAN measurement report. In step S306, such command is transmitted from the eNB to the UE.

Figure 3B:
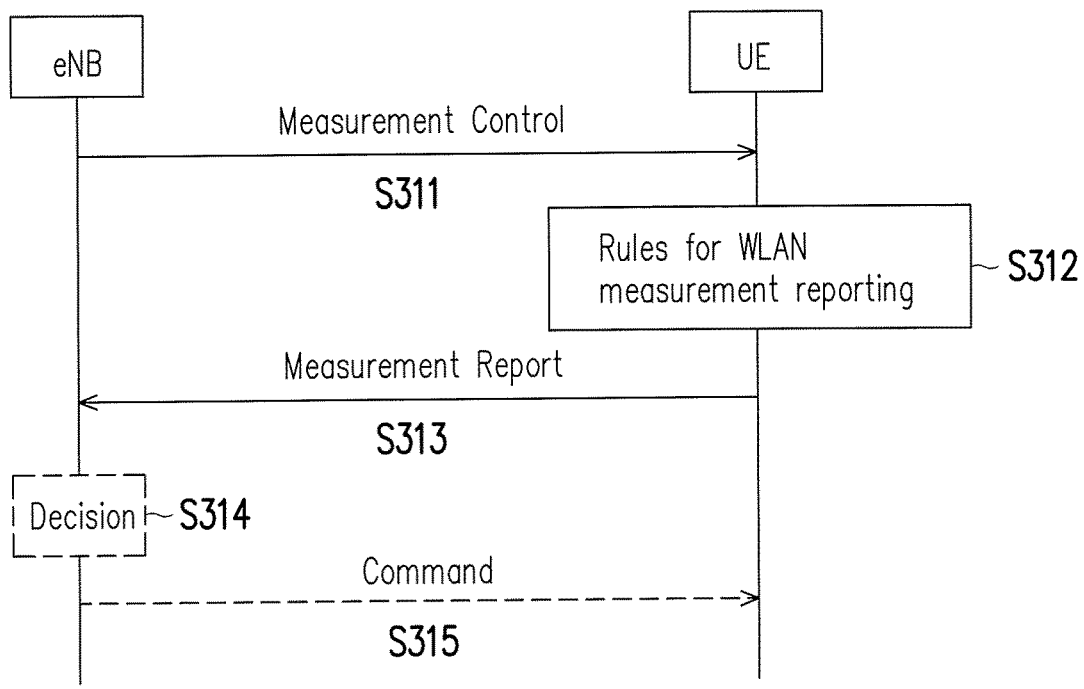
FIG. 3B illustrates the method of controlling a WLAN measurement report applicable to an ENB and a UE in accordance with one of the exemplary embodiments of the disclosure.

FIG. 3B illustrates the method of controlling a WLAN measurement report applicable to an eNB and a UE according to an exemplary embodiment which is similar to FIG. 3A. In step S311, after the eNB has determined to have the UE perform WLAN measurements of a specific AP of a WLAN node, the eNB would transmit a measurement control message to the UE. In step S312, the UE would check the set of rules or cases to determine whether to perform WLAN measurement or to transmit the WLAN measurements to the eNB. The set of rules could be configured by the eNB or pre-configured in UE. In step S312, the UE may transmit to the eNB a measurement report which may or may not contain the requested WLAN measurement results depending of the result of checking the set of rules. In step S314, the eNB would make an appropriate decision as for whether or not to send a command to the UE for LTE+WLAN integration, aggregation or interworking. In step S315, such command could be sent once the eNB has determined to send the command to the UE for LTE+WLAN integration, aggregation or interworking.

Figure 4A:
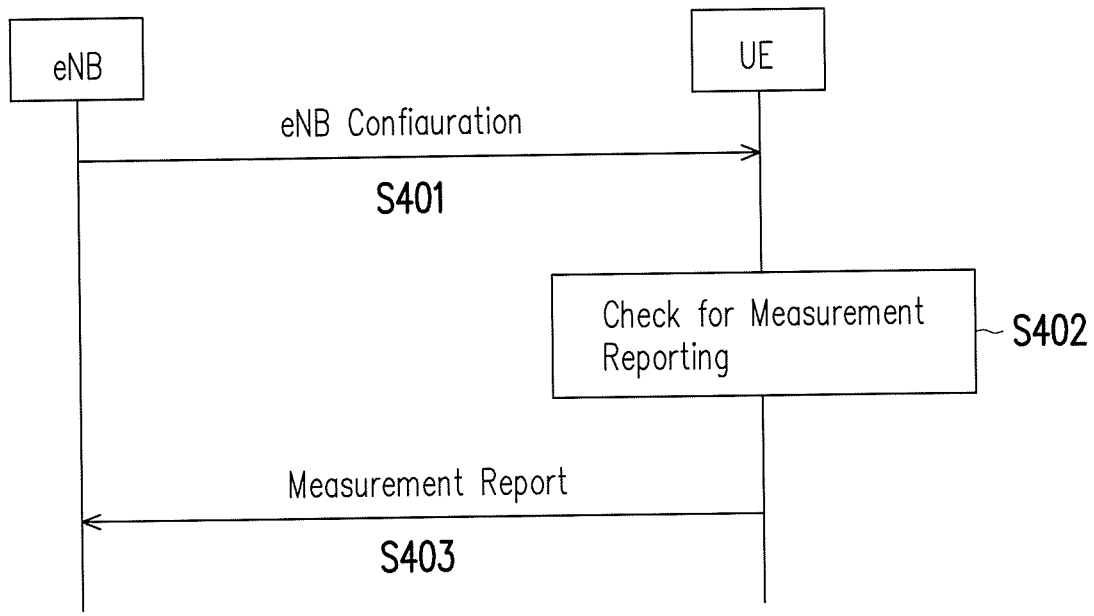
FIG. 4A illustrates a message flow of configuring rules of WLAN measurement reporting in accordance with one of the exemplary embodiments of the disclosure.

FIG. 4A illustrates a message flow of configuring rules of WLAN measurement reporting in accordance with one of the exemplary embodiments of the disclosure. In step S401, the eNB would transmit to the UE an eNB configuration message which may include one or a combination of Measurement Control, Measurement Events, Report Interval, Evaluation Time, Rule enable/disable, Rule indication, set of rules (per UE), parameter/threshold, AP IDs, Feature Command, and etc. The eNB Configuration message would be used to provide, update or modify the set of rules or cases to UE for checking whether to perform WLAN measurement or to transmit the requested WLAN measurements in a WLAN measurement report as well as various parameters and thresholds used by the rules. In further detail, the AP IDs could be, for example, any one of SSID, BSSID, and HESSID that the UE should measure and report. The measurement control may further include communication frequency and communication channel. The set of rules or cases could be represented as a lookup table, a set of data, or an index/indication. The eNB or network may provide a table of rules or cases or indices that point to the rules or cases. The above mentioned rule enable/disable is an indicator to indicate enabling or disabling the application of such set of rules or cases. The Feature Command (e.g., for R12 LTE+WLAN interworking, R13 LTE+WLAN interworking enhancement, or R13 LTE+WLAN aggregation) would to indicate which feature a UE should apply. The Report Interval would indicate the period between measurement reports. The Evaluation Time would indicate the time to perform WLAN measurement. The Rule enable/disable would indicate whether to active or deactivate the set of rules or cases. The Rule Indication would contain a rule index or set number. The eNB configuration message could be implemented via a new message, a Measurement Control message, a RRCConnectionReconfiguration message, or System Information.

In step S402, the UE would check the set of rules so as to determine whether to perform WLAN measurement or to transmit the requested WLAN measurements. In the event that the UE has determined to not transmit the WLAN measurements, the UE may or may not have actually performed the WLAN measurement. In one of the exemplary embodiments, the UE will determine to not transmit a part or all of WLAN measurements corresponding to an AP if at least one of the cases to not transmit the WLAN measurements configuration is satisfied during a time internal as defined by the eNB Configuration message. Similarly, according to an exemplary embodiment, the UE may also determine to transmit a part or all of WLAN measurements corresponding to an AP if at least one of the causes to transmit the WLAN measurement configuration is satisfied during the time interval as defined by the eNB Configuration message.

In step S403, the UE would transmit to the eNB a UE RRC response message which may include one or a combination of a WLAN measurement report, WLAN measurement result, AP IDs, a Cause (e.g., User Preference Indicator (e.g., whether or not UE has preference), WLAN Modem Indicator (e.g., WLAN modem is on or off), counter, or case), WLAN measurement indication (e.g., to indicate whether WLAN measurement results are included), an indication for the ping-pong problem, and etc. Essentially, the Cause would include information as for why partial or all WLAN measurement results are not reported or included. Based on the measurement report, eNB may make a decision to send or not send a command to the UE for LTE/WLAN integration, aggregation or interworking. Subsequently, eNB may then further configure UE with updated information via another eNB Configuration message. The AP ID in UE RRC Response message may include one or a combination of detected APs, measured APs, and associated APs. For example, if at least one of the AP IDs in the UE RRC Response match with the AP IDs contained in the eNB Configuration message, then the eNB may command the UE for interworking or aggregation with the AP of the AP ID based on the measurement report. The UE RRC Response message could be implemented by a RRCConnectionReconfigurationComplete message, a measurement report, or a new message and be triggered by an eNB Configuration message or measurement events.

In one of the exemplary embodiments, the eNB Configuration message may only contain Measurement Control. Also the set of rules or cases which need to be checked for WLAN measurement reporting could already be pre-configured in the UE. Also, the UE RRC Response message may only contain the measurement report. After applying the set of rules or cases, the UE determine to include or not include partial or all of requested WLAN measurement results in the measurement report. In the event that the UE has decided not to include partial or all of requested WLAN measurement results in the measurement report, the UE may nor may not have actually conducted the measurement.

In general, a UE may maintain a table in a storage medium (e.g. 221), and the table would indicate processes to be applied such as performing possible WLAN measurements in response checking upon the set of rules or cases. The table may contain a plurality of fields. Table 1 below is an example of such table which contains three field. However, it would be obvious for an ordinary person skilled in the art to adjust the number of fields for various design purposes. The contents of the table could be updated by the network such as via an eNB Configuration message S401) by adding and removing rules or cases.

TABLE 1

| Rule (match field) | Action (instructions) | Stats (counters) |
| --- | --- | --- |

Table 1 contains a Rule field (in the left column) which define the cases or rules. The UE would check each of the cases or rules to determine whether to report a WLAN measurement. The Action field (in the center column) define the action to be applied to an AP or WLAN measurement reporting such as whether to report a WLAN measurement or not. The Stats field (in the right column) contains counters used to count the number of occurrences of each rule or case for management purposes. For example, a UE may include content of the Stats field in Cause of UE RRC Response message for the purpose of logging measurement.

When a periodical measurement or a measurement reporting event is triggered, the UE will check to see if each of the rules or cases in the Rule field has been satisfied. If so, then the action which corresponds to the Action field would be executed, and the counter in the Stats field would be updated. If none of the rules is satisfied, then UE may report such event to the network. The table may have a priority associated to every entry. For example, a higher number may indicate a higher priority. This priority may be used to match measurement reporting as the Flow Entry that has the higher priority will be used. Based on configured priority, the network may set that some entries with higher priority may be used to determine whether or not to perform WLAN measurement, to transmit a WLAN measurement result, or to include a WLAN measurement result in WLAN measurement report.

Figure 4B:
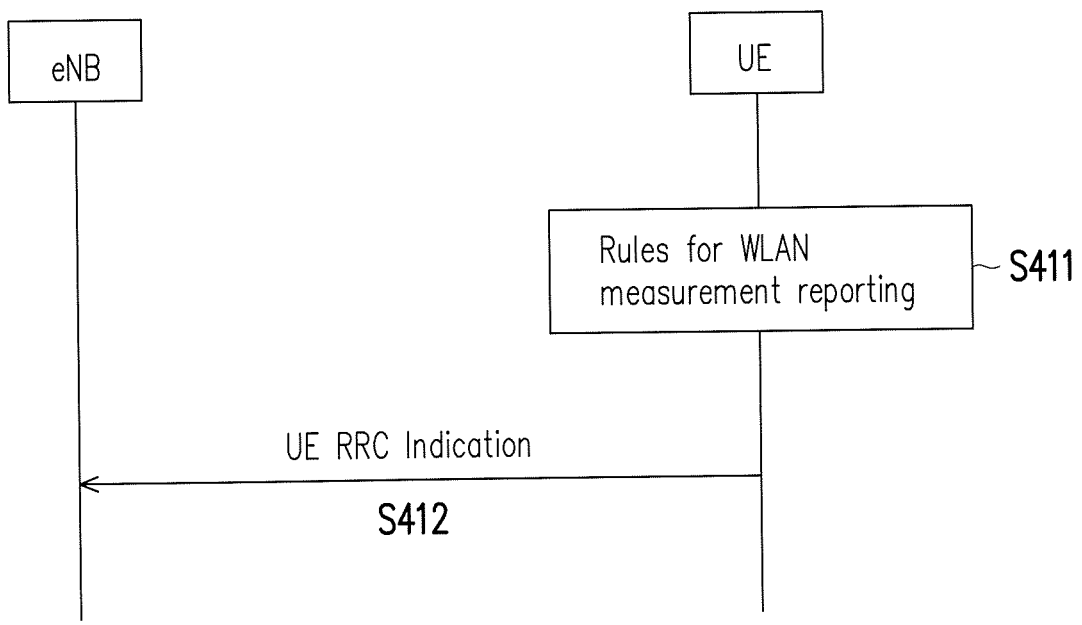
FIG. 4B illustrates another example of a message flow of configuring rules of WLAN measurement reporting in accordance with one of the exemplary embodiments of the disclosure.

FIG. 4B illustrates an exemplary embodiment which is similar to FIG. 4A in accordance with the disclosure. After the UE in step S411 checks the set of rules so as to determine whether to report a WLAN measurement, the UE in step S412 would transmit a RRC indication message which would include not limited to a Cause to indicate the reason why a WLAN measurement result was reported or included in a WLAN measurement report, or why the LTE/WLAN aggregation or interworking is not available. The UE RRC Indication of step S412 could be sent by UE automatically or with/without an eNB configuration (e.g. S401) message sent from an eNB. The UE RRC Indication may further include not limited to a WLAN Modem Indicator which indicates whether the WLAN modem that corresponds to the WLAN measurement is on or off. The Cause may also include a user preference which is explained in subsequent embodiments.

Figure 5:
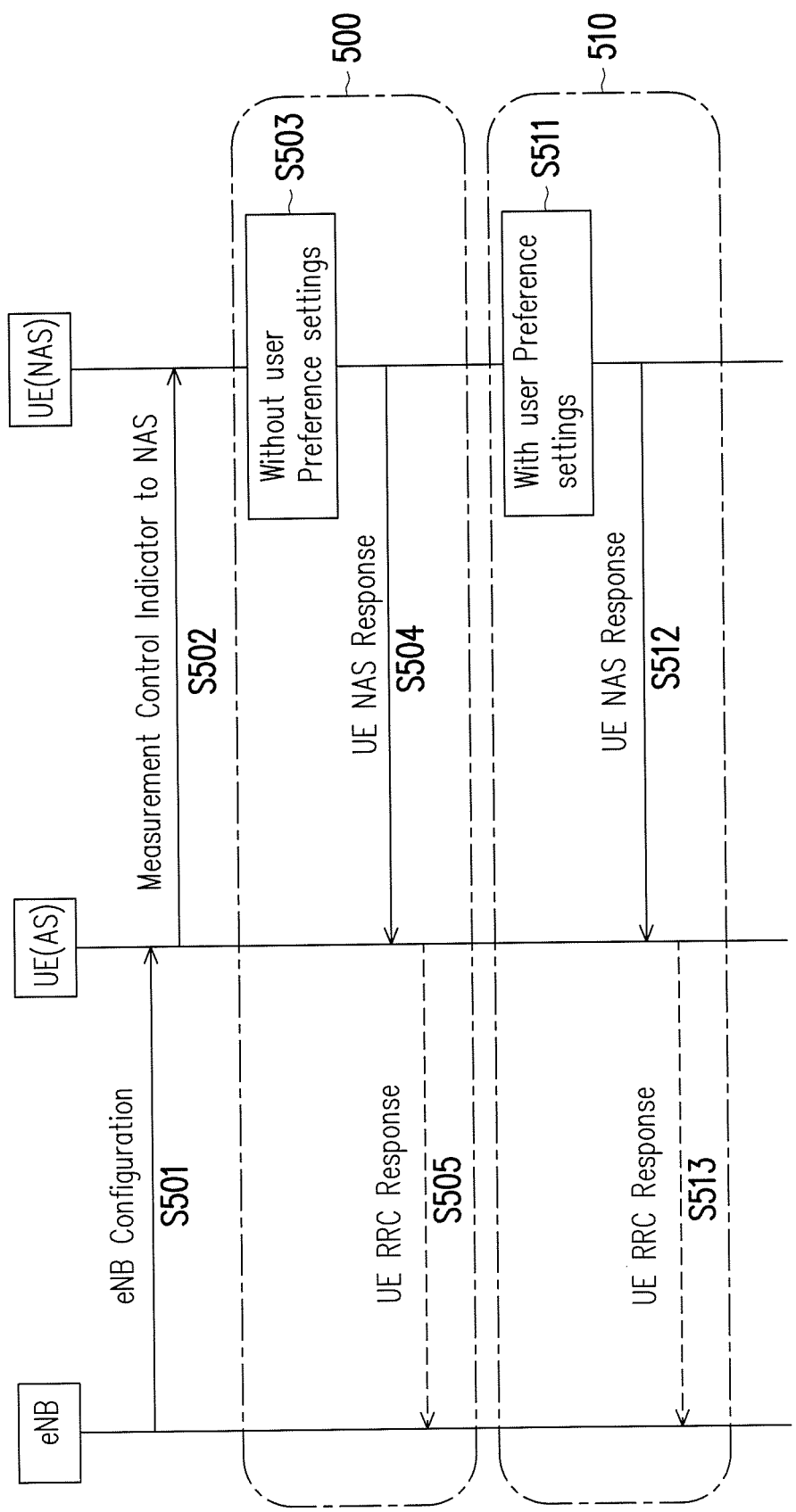
FIG. 5 illustrates a message flow of configuring rules of WLAN measurement reporting by taking user preference settings into account in accordance with one of the exemplary embodiments of the disclosure.

FIG. 5 illustrates a message flow of configuring rules of WLAN measurement reporting by taking user preference settings into account in accordance with one of the exemplary embodiments of the disclosure. The message of FIG. 4 further includes the interaction between UE access stratum (AS) layer and UE non-access stratum (NAS) layer. In step S401, the UE would receive an eNB Configuration message for performing measurement reporting. In step S402, the UE AS layer would send a Measurement Control Indicator to UE NAS layer to request a user preference or a user preference setting. The UE NAS layer may then reply with a UE NAS Response message/indication to the UE AS layer with a first option 500 or with a second option 510. If the UE NAS layer replies with the first option 500, then in step S503, the UE NAS layer would check the set of rules or cases without considering a user preference or a user preference setting. Instep S504, the UE NAS layer would reply with a UE NAS Response message which is without a user preference indicator or a user preference setting. In step S505, the UE AS layer would transmit to the eNB a UE RRC Response message which would include the requested WLAN measurement results. If the UE NAS layer replies with the second option 510, then in step S511, the UE NAS layer would check the set of rules or cases by considering a user preference or a user preference setting. Instep S512, the UE NAS layer would reply with a UE NAS Response message which is with a user preference indicator or a user preference setting. In step S53, the UE AS layer would transmit to the eNB a UE RRC Response message which would exclude the requested WLAN measurement results but may include a Cause which indicates the reason why the requested WLAN results are excluded.

Figure 6:
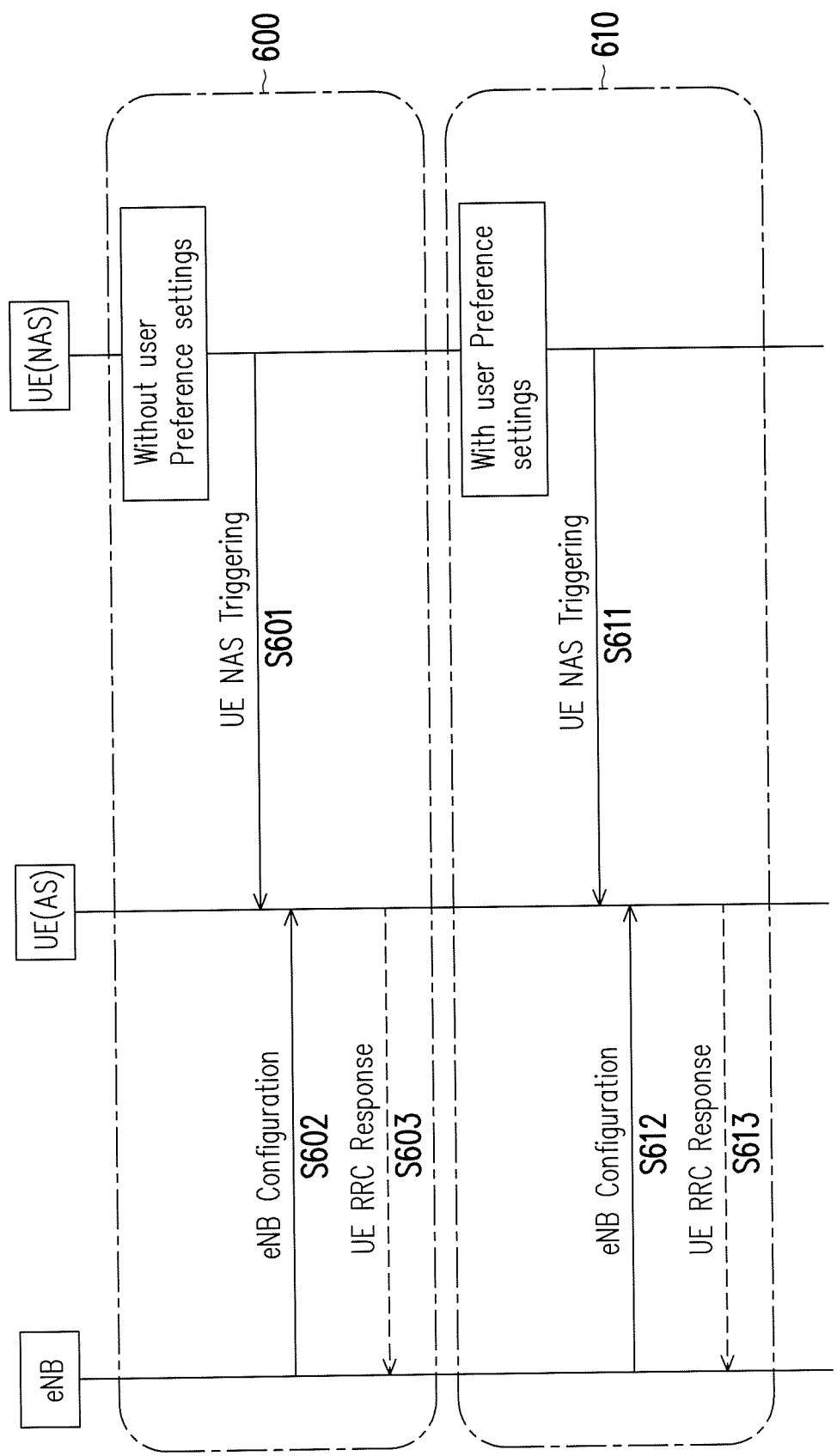
FIG. 6 illustrates another example of a message flow of configuring rules of WLAN measurement reporting by taking user preference settings into account in accordance with one of the exemplary embodiments of the disclosure.

FIG. 6 illustrates another example of a message flow of configuring rules of WLAN measurement reporting by taking user preference settings into account in accordance with one of the exemplary embodiments of the disclosure. For this exemplary embodiment, the UE NAS layer may trigger a UE NAS Triggering message/indication to the UE AS layer when a user preference setting has been changed. When UE receives an eNB Configuration message, the UE would check configured rules/cases and may reply with a UE RRC Response message to the eNB or network by choosing the first option 600 which is without user preference settings to include WLAN measurement results or by using the second option 610 which is with user preference settings to exclude WLAN measurement results.

For the first option which is without user preference settings, in step S601, the UE AS layer may receive a UE NAS Triggering signal. In step S602, the eNB would transmit an eNB configuration message which may include measurement control to the UE AS layer. Upon receiving the eNB configuration message, the UE would check the set of rules or cases to determine whether to report WLAN measurements. In step S603, the UE AS layer would reply with a UE RRC Response which includes WLAN measurement results.

For the second option which is with user preference settings, in step S611, the UE AS layer may receive a UE NAS Triggering signal. In step S612, the eNB would transmit an eNB configuration message which may include measurement control to the UE AS layer. Upon receiving the eNB configuration message, the UE would check the set of rules or cases to determine whether to report WLAN measurements. In step S613, the UE AS layer would reply with a UE RRC Response which excludes WLAN measurement results but may include a Cause which indicates the reason why WLAN measurement results have been excluded.

Figure 7:
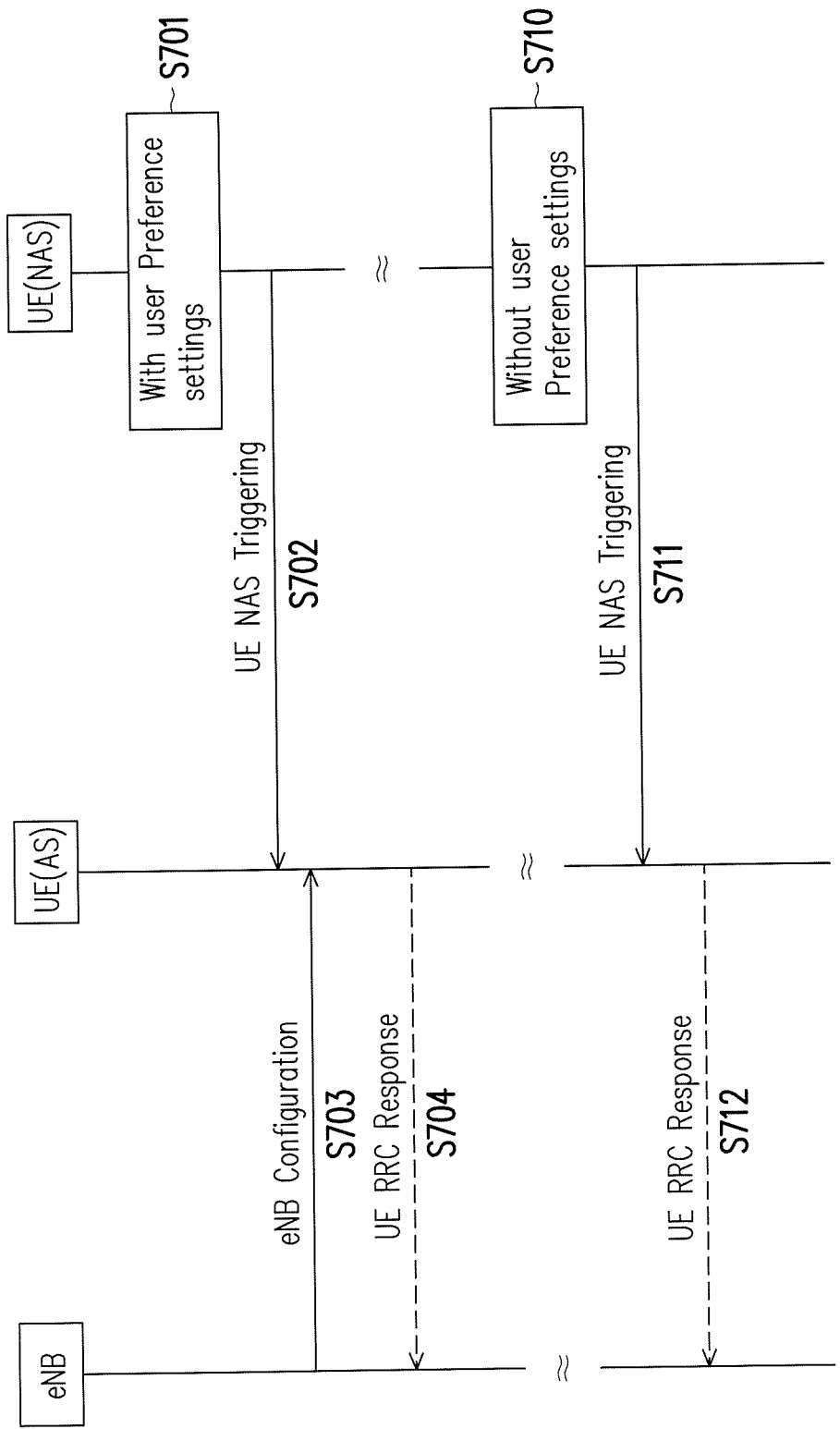
FIG. 7 illustrates a message flow of a case in which the use preference settings change in accordance with one of the exemplary embodiments of the disclosure.

FIG. 7 illustrates a message flow of a case in which the use preference settings change in accordance with one of the exemplary embodiments of the disclosure. The exemplary embodiment of FIG. 7 shows that user preference settings could be changed. When a user preference setting has been changed, the UE NAS layer may indicate such change to the UE AS layer. Consequently, WLAN measurement results may be included. The user preference setting could be indicated by a value of a user preference indicator which could be toggled between two values such as a binary 0 or a binary 1.

Assuming that UE has been set to have a user preference setting, in step S701, then in step S702, UE NAS layer may would send a UE NAS Triggering signal to the UE AS layer. In step S703, the eNB would transmit an eNB configuration message which may include measurement control to the UE AS layer. Upon receiving the eNB configuration message, the UE would check the set of rules or cases to determine whether to report WLAN measurements. In step S704, the UE AS layer would reply with a UE RRC Response which includes WLAN measurement results or the aforementioned user preference indicator.

Assuming that the UE has changed to be without user preference settings, in step S710, then in step S711 the UE NAS layer may send a UE NAS Triggering signal to the UE AS layer. In step S712, the UE AS layer may send a UE RRC Response message which includes WLAN measurement results and may also include the aforementioned user preference indicator which has been toggled.

Figure 8:
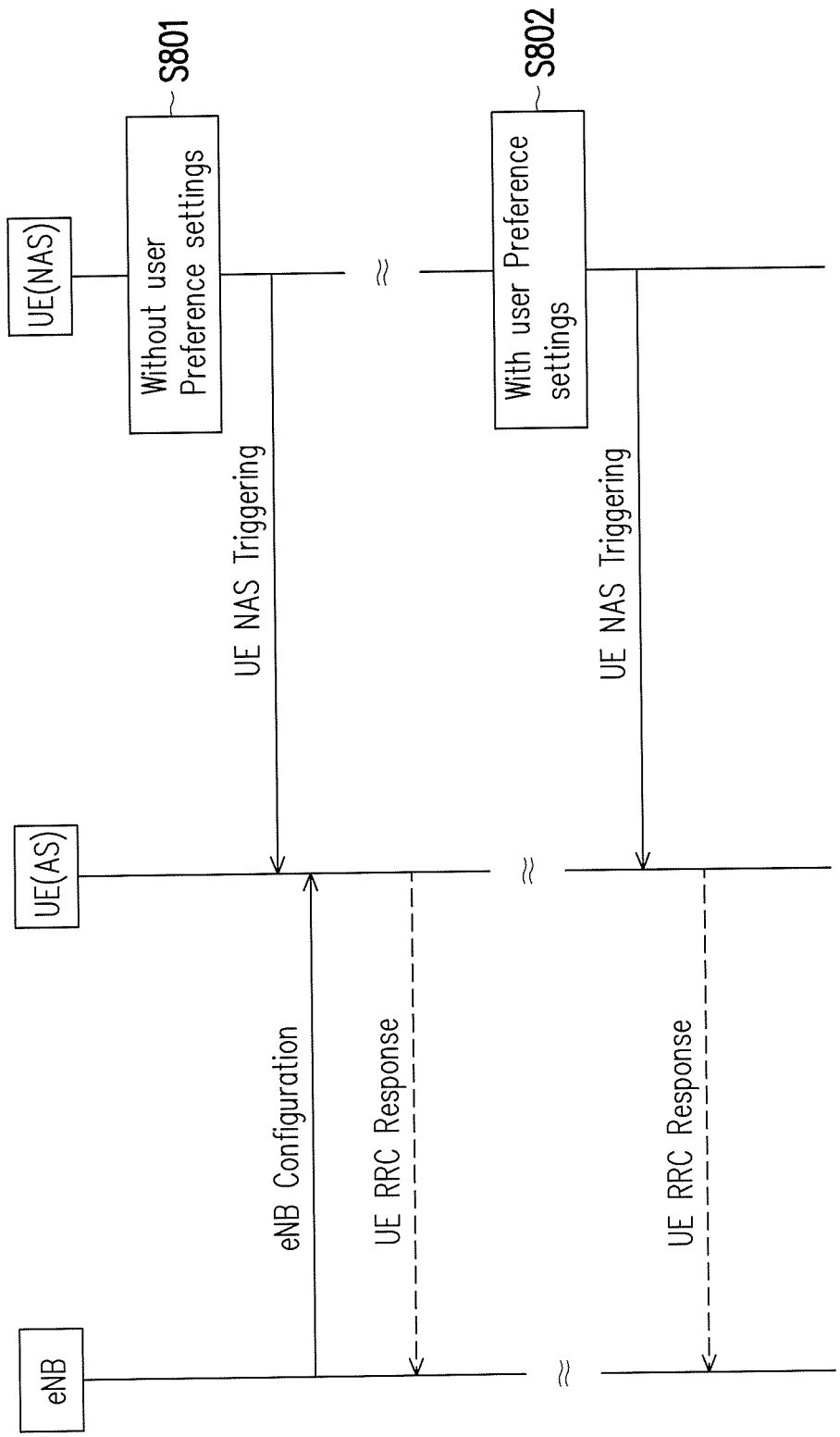
FIG. 8 illustrates a message flow of a case in which the use preference settings change as time goes by in accordance with one of the exemplary embodiments of the disclosure

FIG. 8 illustrates a message flow of a case in which the use preference settings change as time goes by in accordance with one of the exemplary embodiments of the disclosure. For this exemplary embodiment, the value of user preference indicator could be toggled between different states such as from a binary 0 to a binary 1 or vice versa. Assuming in step S801 that UE has been set to be without user preference settings, the user preference indicator could be set to have a value of a binary 0. The UE NAS layer may send a UE NAS Triggering signal to the UE AS layer. In step S802, the UE could instate a user preference settings and thus the user preference indicator could be toggled to a binary 1.

Figure 9:
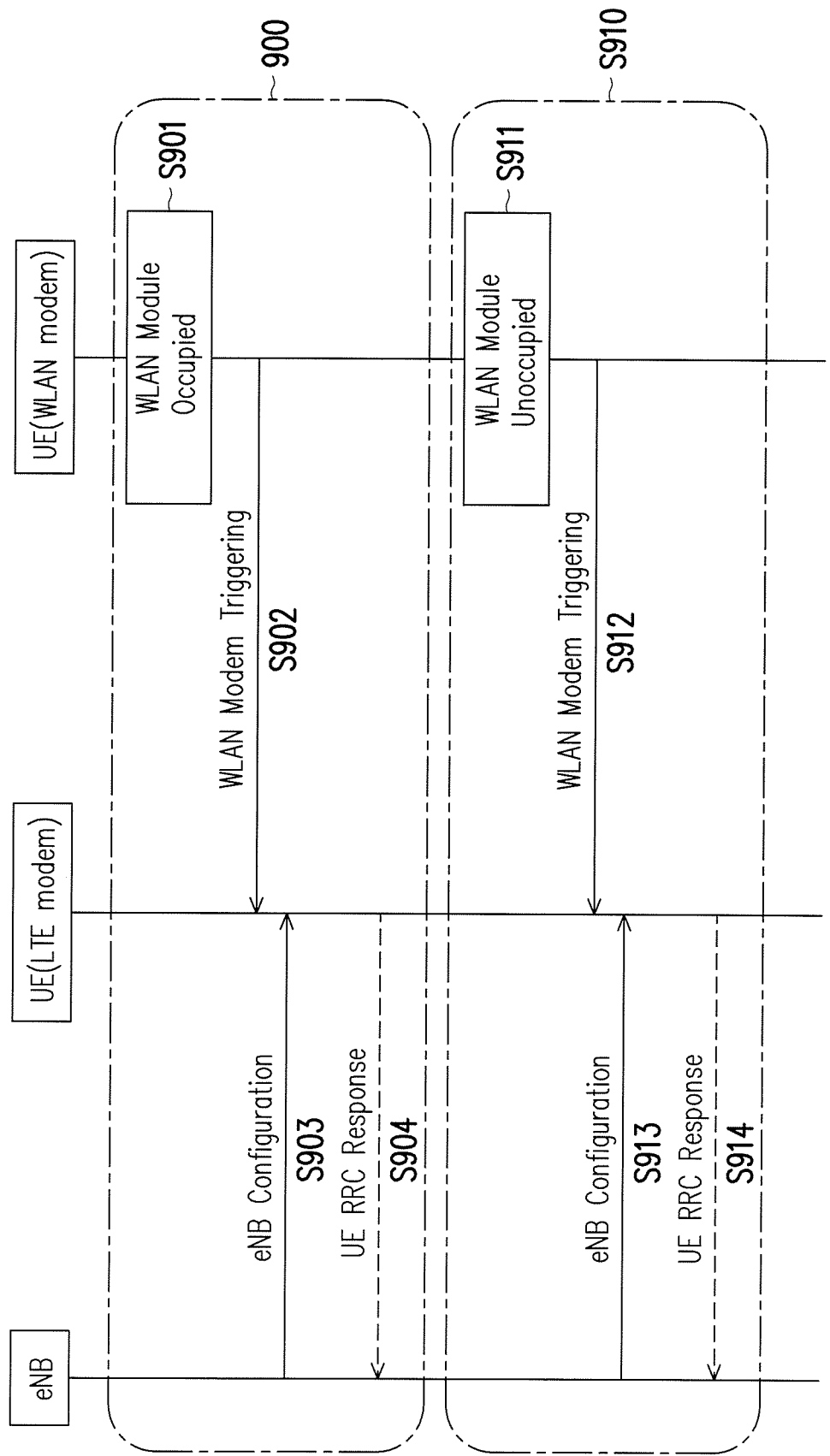
FIG. 9 illustrates a message flow of a case by considering WLAN modem in accordance with one of the exemplary embodiments of the disclosure.

FIG. 9 illustrates a message flow of a case by considering WLAN modem in accordance with one of the exemplary embodiments of the disclosure. The UE WLAN modem may trigger an indication/message to UE LTE modem when WLAN modem is occupied as in the first option 900 or unoccupied as in the second option 910 via WLAN Modem Triggering. Consequently, UE would check the configured set of rules or case and transmit a UE RRC Response message which would exclude WLAN measurement results as in the first option 900 or include WLAN measurement result as in the second option 910.

For the first option 900, in step S901, the WLAN module of the UE is determined to be occupied. In step S902, the UE WLAN modem would send a WLAN modem triggering to the LTE modem of the UE. In step S903, the LTE modem of the UE may receive an eNB Configuration message which may include measurement control. In response to checking the configured set of rules or cases, in step S904, the LTE modem of the UE may reply with a UE RRC Response message which would include a WLAN Modem indicator or exclude WLAN measurement results. The WLAN modem indicator would indicates whether the WLAN module is occupied or not occupied.

For the second option 910, in step S911, the WLAN module of the UE is determined to be not occupied. In step S912, the UE WLAN modem would send a WLAN modem triggering to the LTE modem of the UE. In step S913, the LTE modem of the UE may receive an eNB Configuration message which may include measurement control. In response to checking the configured set of rules or cases, in step S914, the LTE modem of the UE may reply with a UE RRC Response message which would include WLAN measurement results.

Figure 10:
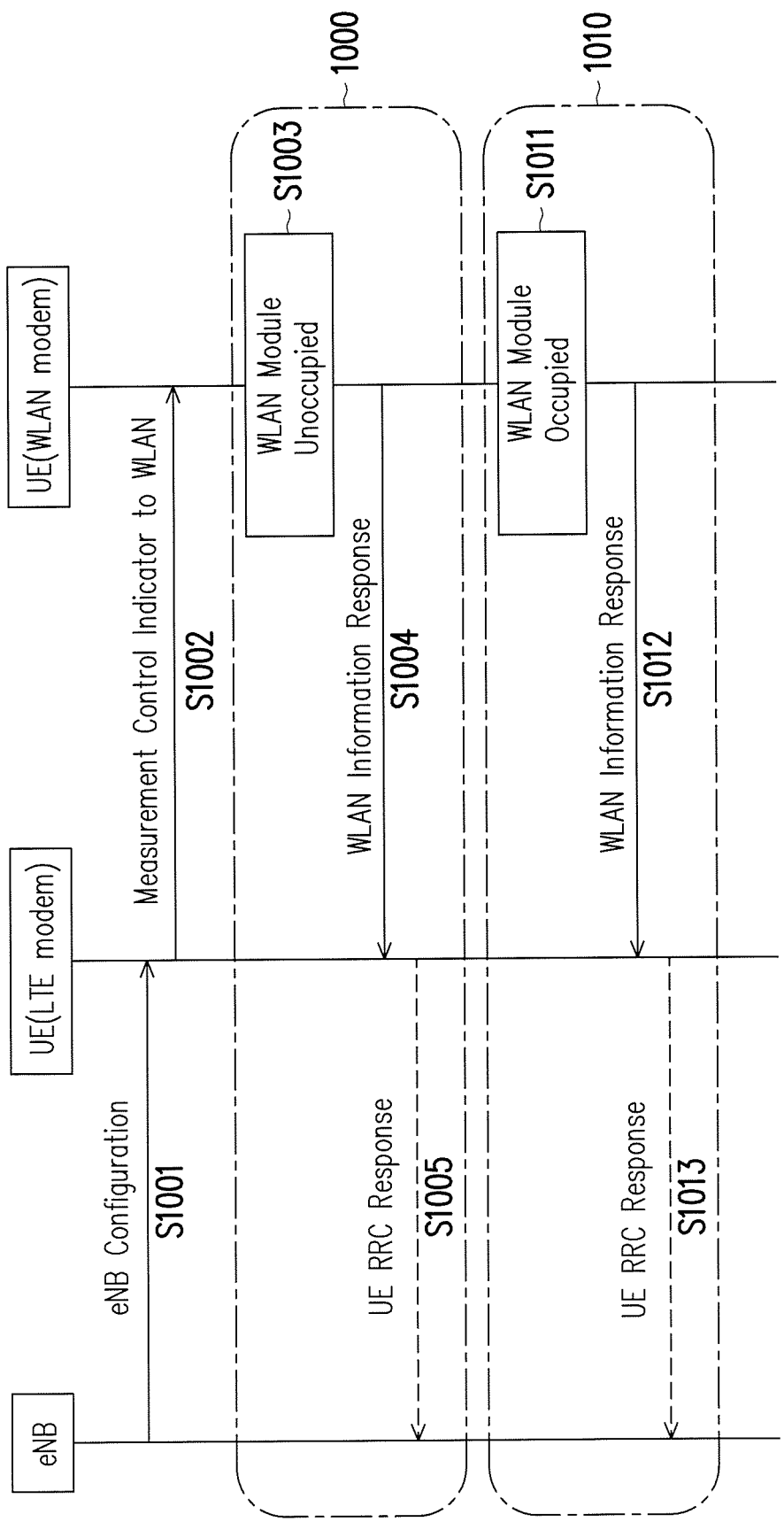
FIG. 10 illustrates another example of a message flow of a case by considering WLAN modem in accordance with one of the exemplary embodiments of the disclosure.

FIG. 10 illustrates another example of a message flow of a case by considering WLAN modem in accordance with one of the exemplary embodiments of the disclosure. For this exemplary embodiment, the LTE modem of a UE may request for information of the situation of UE WLAN modem via Measurement Control Indicator to WLAN. In response to receiving Measurement Control Indicator, the UE WLAN modem may transmit a reply via WLAN Information Response. Furthermore, the UE may transmit a UE RRC Response message via the UE LTE Modem by selecting the first option to include WLAN measurement results or by selecting the second option to exclude WLAN measurement results.

In further detail, in step S1001, the eNB may transmit an eNB Configuration message which may include measurement control. In step S1002, the LTE modem of the UE may acquire the status of the WLAN modem by transmitting a Measurement Control Indicator to the WLAN modem. If in step S1003 the WLAN module is not occupied, then in step S1004, the WLAN modem would transmit to the LTE modem a WLAN Information Response which indicates that the WLAN module is not occupied. In step S1005, the LTE modem of the UE would transmit a UE RRC Response to the eNB which would include WLAN measurement results. If the WLAN module is determined to be occupied in step S1011, then in step S1012, the WLAN Information Response will be transmitted from the WLAN modem to the LTE modem to indicate that the WLAN module is occupied. In step S1013, the LTE modem of the UE would transmit the UE RRC Response which would excludes WLAN measurement results but include the WLAN modem indicator to inform the eNB the status of the WLAN modem.

The following disclosure provides the procedure of the UE checking rules or cases with further detail. For this exemplary embodiment, a UE would check the set of configured rules or cases, and then the UE will either not report WLAN measurement results to eNB/network (e.g. event triggering) or not include WLAN measurement results in measurement reports (e.g. periodical measurement report) when one or more the following cases is satisfied for a time interval:

Case 1: User preference setting of the UE restrains the use of the WLAN.

Case 2: WLAN module of the UE is unavailable or occupied by other features.

Case 3: The mobility of the UE is handled by one or more APs within an AP list given by an eNB.

Case 4: The load of the serving AP has changed and is over a predetermined threshold (i.e. overloaded).

Case 5: The parameter 'BeaconRSSI' of an AP list is over a predetermined threshold.

Case 6: The UE mobility state or speed is over a predetermined threshold.
Case 7: The UE does not carry offloadable traffic.

For example, UE checks rules/cases. The disclosure proposes a new information element (IE) that specifies the criteria for triggering of an measurement reporting event. For example, the IE could be modified IE ReportConfigEUTRA.

| Event  | Description |
| --- | --- |
| Case 1 | User preference setting of the UE restrains the use of the WLAN |

If one or more of cases is fulfilled, (e.g., Case1: UE has user preference setting)
    UE refrains WLAN measurement reports. (e.g., modified IE MeasResults)
Else,
    UE follows Measurement Control.
End
For example, UE checking rules or cases:
If periodical measurement report is configured (e.g., modified IE ReportInterval) or one of measurement events for WLAN (LTE events [3GPP TS 36.331] or new events) is satisfied

| Event | Description |
| --- | --- |
| W1 | WLAN becomes better than a threshold (to trigger traffic steering to WLAN) |
| W2 | WLAN becomes worse than a threshold (to trigger traffic steering from WLAN) |
| W3 | 3GPP Cell's radio quality becomes worse than threshold 1 and WLAN radio quality becomes better than threshold 2 (to trigger traffic steering to WLAN) |
| W4 | WLAN radio quality becomes worse than threshold 1 and 3GPP Cell's radio quality becomes better than threshold 2 (to trigger traffic steering from WLAN) | if cases are configured
    If one or more of cases is fulfilled, (e.g., Case1: UE has user preference setting)
      UE refrains WLAN measurement reports. (e.g., modified IE MeasResults)
    Else
      UE follows Measurement Control.
    End
  Else
    UE follows Measurement Control.
  End
End
For example, UE checking rules/cases. The UE would not report whole WLAN measurement results to eNB or network (e.g., event triggering) or not include whole WLAN measurement results in measurement reports (e.g., periodical measurement report) when one or more the following cases is satisfied for a time interval:
Case 1: User preference setting of the UE restrains the use of the WLAN.
Case 2: WLAN module of the UE is unavailable or occupied by other features.
Case 3: The mobility of the UE is handled by one or more APs within an AP list given by an eNB.
Case 4: The load of the serving AP has changed and is over a predetermined threshold (i.e. overloaded).
Case 5: The parameter 'BeaconRSSI' of an AP list is over a predetermined threshold.
Case 6: The UE mobility state or speed is over a predetermined threshold.
Case 7: The UE does not carry offloadable traffic.
This example may depend on specific APs. Results of partial APs may be included, but others are not included.

For example, UE checks rules/cases. The disclosure proposes a new information element (IE) that specifies the criteria for triggering of an measurement reporting event. For example, the IE could be modified IE ReportConfigEUTRA.

| Event  | Description |
| --- | --- |
| Case 3 | The mobility of the UE is handled by one or more APs within an AP list given by an eNB |

If one or more of cases is fulfilled, (e.g., Case 3: The mobility of the UE is handled by one or more APs within an AP list given by an eNB)
    UE refrains whole WLAN measurement reports. (e.g., modified IE MeasResults)
Else,
    UE follows Measurement Control.
End
For example, UE checks rules/cases.
If periodical measurement report is configured (e.g., modified IE ReportInterval) or one of measurement events for WLAN (LTE events or new events) is satisfied

| Event | Description |
| --- | --- |
| W1 | WLAN becomes better than a threshold (to trigger traffic steering to WLAN) |
| W2 | WLAN becomes worse than a threshold (to trigger traffic steering from WLAN) |
| W3 | 3GPP Cell's radio quality becomes worse than threshold 1 and WLAN radio quality becomes better than threshold 2 (to trigger traffic steering to WLAN) |
| W4 | WLAN radio quality becomes worse than threshold 1 and 3GPP Cell's radio quality becomes better than threshold 2 (to trigger traffic steering from WLAN) | if cases are configured
    If one or more of cases is fulfilled, (e.g., Case 3: UE mobility within a AP list given by eNB)
      UE refrains whole WLAN measurement reports. (e.g., modified IE MeasResults)
    Else
      UE follows Measurement Control.
    End
  Else
    UE follows Measurement Control.
  End
End
For example, UE checks rules/cases. UE shall only report relevance LTE measurement results to eNB/network (e.g., event triggering) or only report relevance LTE measurement results (e.g., periodical measurement report) when one or more the following cases is satisfied for a time interval:
Case 1: User preference setting of the UE restrains the use of the WLAN.
Case 2: WLAN module of the UE is unavailable or occupied by other features.
Case 3: The mobility of the UE is handled by one or more APs within an AP list given by an eNB.

Case 4: The load of the serving AP has changed and is over a predetermined threshold (i.e. overloaded).
Case 5: The parameter 'BeaconRSSI' of an AP list is over a predetermined threshold.
Case 6: The UE mobility state or speed is over a predetermined threshold.
Case 7: The UE does not carry offloadable traffic.

In this example, UE may only report LTE measurement results (e.g., RSRP, RSRQ). WLAN measurement results are not included or not reported.

For example, UE checks rules/cases. The disclosure proposes a new information element (IE) that specifies the criteria for triggering of a measurement reporting event. For example, the IE could be modified IE ReportConfigEUTRA.

| Event | Description |
|---|---|
| Case 1 | User preference setting of the UE restrains the use of the WLAN |

If one or more of cases is fulfilled, (e.g., Case1: UE has user preference setting)
    UE refrains WLAN measurement reports and reports relevance LTE measurement results (e.g., modified IE MeasResults).
Else,
    UE follows Measurement Control.
End For example, UE checks rules/cases.
If periodical measurement report is configured (e.g., modified IE ReportInterval) or one of measurement events for WLAN (LTE events or new events) is satisfied

| Event | Description |
|---|---|
| W1 | WLAN becomes better than a threshold (to trigger traffic steering to WLAN) |
| W2 | WLAN becomes worse than a threshold (to trigger traffic steering from WLAN) |
| W3 | 3GPP Cell's radio quality becomes worse than threshold 1 and WLAN radio quality becomes better than threshold 2 (to trigger traffic steering to WLAN) |
| W4 | WLAN radio quality becomes worse than threshold 1 and 3GPP Cell's radio quality becomes better than threshold 2 (to trigger traffic steering from WLAN) | if cases are configured
    If one or more of cases is fulfilled, (e.g., Case 1: UE has user preference setting)
      UE refrains WLAN measurement reports and reports relevance LTE measurement results. (e.g., modified IE MeasResults)
    Else
      UE follows Measurement Control.
    End
  Else
    UE follows Measurement Control.
  End
End For example, UE checks rules/cases. UE shall report relevance LTE measurement results with partial WLAN measurement results to eNB/network (e.g., event triggering) or report relevance LTE measurement results with partial WLAN measurement results (e.g., periodical measurement report) when one or more the following cases is satisfied for a time interval:

Case 1: User preference setting of the UE restrains the use of the WLAN.
Case 2: WLAN module of the UE is unavailable or occupied by other features.
Case 3: The mobility of the UE is handled by one or more APs within an AP list given by an eNB.
Case 4: The load of the serving AP has changed and is over a predetermined threshold (i.e. overloaded).
Case 5: The parameter 'BeaconRSSI' of an AP list is over a predetermined threshold.
Case 6: The UE mobility state or speed is over a predetermined threshold.
Case 7: The UE does not carry offloadable traffic.

In this example, LTE measurement results and WLAN measurement results may be included in a reporting message.

For example, UE checks rules/cases. The disclosure proposes a new information element (IE) that specifies the criteria for triggering of an measurement reporting event. For example, the IE could be modified IE ReportConfigEUTRA.

| Event | Description |
|---|---|
| Case 3 | The mobility of the UE is handled by one or more APs within an AP list given by an eNB |

If one or more of cases is fulfilled, (e.g., Case 3: UE mobility within a AP list given by eNB)
    UE reports relevance LTE measurement results with partial WLAN measurement results. (e.g., modified IE MeasResults)
Else,
    UE follows Measurement Control.
End For example, UE checks rules/cases.
If periodical measurement report is configured (e.g., modified IE ReportInterval) or one of measurement events for WLAN (LTE events or new events) is satisfied

| Event | Description |
|---|---|
| W1 | WLAN becomes better than a threshold (to trigger traffic steering to WLAN) |
| W2 | WLAN becomes worse than a threshold (to trigger traffic steering from WLAN) |
| W3 | 3GPP Cell's radio quality becomes worse than threshold 1 and WLAN radio quality becomes better than threshold 2 (to trigger traffic steering to WLAN) |
| W4 | WLAN radio quality becomes worse than threshold 1 and 3GPP Cell's radio quality becomes better than threshold 2 (to trigger traffic steering from WLAN) | if cases are configured
    If one or more of cases is fulfilled, (e.g., Case3: UE mobility within a AP list given by eNB)
      UE reports relevance LTE measurement results with partial WLAN measurement results. (e.g., modified IE MeasResults)
    Else
      UE follows Measurement Control.
    End
  Else
    UE follows Measurement Control.

End
End

One additional bit (e.g., WLAN measurement indication) could be used, for example, in the modified IE MeasResults to indentify whether the measurement report incould WLAN measurement result. The eNB/network could speed up the measurement result analysis by checking the WLAN measurement indication from the modified IE MeasResults.

For example, UE checks rules/cases. UE shall only report relevance LTE measurement results to eNB/network (e.g., event triggering) or only report relevance LTE measurement results (e.g., periodical measurement report) when one or more the following cases is satisfied for a time interval:

Case 1: User preference setting of the UE restrains the use of the WLAN.
Case 2: WLAN module of the UE is unavailable or occupied by other features.
Case 3: The mobility of the UE is handled by one or more APs within an AP list given by an eNB.
Case 4: The load of the serving AP has changed and is over a predetermined threshold (i.e. overloaded).
Case 5: The parameter 'BeaconRSSI' of an AP list is over a predetermined threshold.
Case 6: The UE mobility state or speed is over a predetermined threshold.
Case 7: The UE does not carry offloadable traffic.

In this example, measurement report or LTE measurement results may include a bit (i.e., WLAN measurement indication) to indicate whether or not WLAN measurement results are included.

For example, UE checks rules/cases. The disclosure proposes a new information element (IE) that specifies the criteria for triggering of a measurement reporting event. For example, the IE could be modified IE ReportConfigEUTRA.

| Event | Description |
|---|---|
| Case 1 | User preference setting of the UE restrains the use of the WLAN |

If one or more of cases is fulfilled, (e.g., Case1: UE has user preference setting)
   UE refrains WLAN measurement reports and reports relevance LTE measurement results (e.g., modified IE MeasResults). UE sets the WLAN measurement indication to be faulse.
Else,
   UE follows Measurement Control.
End For example, UE checks rules/cases.
If periodical measurement report is configured (e.g., modified IE ReportInterval) or one of measurement events for WLAN (LTE events or new events) is satisfied

| Event | Description |
|---|---|
| W1 | WLAN becomes better than a threshold (to trigger traffic steering to WLAN) |
| W2 | WLAN becomes worse than a threshold (to trigger traffic steering from WLAN) |
| W3 | 3GPP Cell's radio quality becomes worse than threshold 1 and WLAN radio quality becomes better than threshold 2 (to trigger traffic steering to WLAN) |
| W4 | WLAN radio quality becomes worse than threshold 1 and 3GPP Cell's radio quality becomes better than threshold 2 (to trigger traffic steering from WLAN) | if cases are configured
   If one or more of cases is fulfilled, (e.g., Case1: UE has user preference setting)
      UE refrains WLAN measurement reports and reports relevance LTE measurement results (e.g., modified IE MeasResults). UE sets the WLAN measurement indication to be faulse.
   Else
      UE follows Measurement Control.
   End
Else
   UE follows Measurement Control.
End For example, UE checks rules/cases. UE would report relevant LTE measurement results with partial WLAN measurement results to eNB/network (e.g., event triggering) or report relevant LTE measurement results with partial WLAN measurement results (e.g., periodical measurement report) when one or more the following cases is satisfied for a time interval:

Case 1: User preference setting of the UE restrains the use of the WLAN.
Case 2: WLAN module of the UE is unavailable or occupied by other features.
Case 3: The mobility of the UE is handled by one or more APs within an AP list given by an eNB.
Case 4: The load of the serving AP has changed and is over a predetermined threshold (i.e. overloaded).
Case 5: The parameter 'BeaconRSSI' of an AP list is over a predetermined threshold.
Case 6: The UE mobility state or speed is over a predetermined threshold.
Case 7: The UE does not carry offloadable traffic.

In this example, a bit may be used to indicate whether WLAN measurement results are included.

For example, UE checks rules/cases. The disclosure proposes a new information element (IE) that specifies the criteria for triggering of a measurement reporting event. For example, the IE could be modified IE ReportConfigEUTRA.

| Event | Description |
|---|---|
| Case 3 | The mobility of the UE is handled by one or more APs within an AP list given by an eNB |

If one or more of cases is fulfilled, (e.g., Case 3: UE mobility within a AP list given by eNB)
   UE reports relevance LTE measurement results with partial WLAN measurement results (e.g., modified IE MeasResults). UE sets the WLAN measurement indication to be truth.
Else,
   UE follows Measurement Control.
End For example, UE checks rules/cases.
If periodical measurement report is configured (e.g., modified IE ReportInterval) or one of measurement events for WLAN (LTE events or new events) is satisfied

| Event | Description |
| --- | --- |
| W1 | WLAN becomes better than a threshold (to trigger traffic steering to WLAN) |
| W2 | WLAN becomes worse than a threshold (to trigger traffic steering from WLAN) |
| W3 | 3GPP Cell's radio quality becomes worse than threshold 1 and WLAN radio quality becomes better than threshold 2 (to trigger traffic steering to WLAN) |
| W4 | WLAN radio quality becomes worse than threshold 1 and 3GPP Cell's radio quality becomes better than threshold 2 (to trigger traffic steering from WLAN) |

```
    if cases are configured
        If one or more of cases is fulfilled, (e.g., Case 3: UE
            mobility within a AP list given by eNB)
            UE reports relevance LTE measurement results
                with partial WLAN measurement results (e.g.,
                modified IE MeasResults). UE sets the WLAN
                measurement indication to be truth.
        Else
            UE follows Measurement Control.
        End
    Else
        UE follows Measurement Control.
    End
End
```

N/A (not available) may be utilized as the value of WLAN measurement results for UE to refrain WLAN measurement reports.

LTE measurement control and WLAN measurement control may be configured jointly in eNB Configuration (e.g., Measurement Control), or may be configured separately in two messages. LTE measurement results and WLAN measurement results may be comprised jointly in UE RRC Response (e.g., Measurement Report), may be reported separately in two messages.

For example, UE may not be allowed user preference or other cases to be overridden by the network or eNB command. UE may follow the configuration/command from eNB and rules for checking WLAN measurement reporting as mentioned above.

For example, UE may be allowed user preference or other cases to be overridden by the network or eNB command. UE may follow the configuration/command from eNB for checking measurement reporting while UE may also include a cause to indicate which case UE follows eNB's command (i.e., not depending on UE's preference, UE's condition, or AP's condition).

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope of the disclosure. In view of the foregoing, it is intended that the disclosure cover modifications and variations of this disclosure provided they fall within the scope of the following claims and their equivalents.

What is claimed is:

1. A method of controlling wireless local area network (WLAN) measurement report applicable to a user equipment (UE), the method comprising:
    receiving a configuration message which provides or updates a set of rules;
    determining whether to transmit a WLAN measurement result by checking the set of rules and a user preference setting after receiving the configuration message; and
    generating a WLAN measurement report comprising the WLAN measurement result and transmitting a response message comprising the WLAN measurement report in response to having determined to transmit the WLAN measurement result based on the set of rules and the user preference setting, wherein a rule of the set of rules comprises:
    a received signal strength indicator (RSSI) of an access point (AP) within an AP list provided by a serving eNB is less than a predefined second threshold and a received signal strength indicator (RSSI) of an access point (AP) not within an AP list provided by a serving eNB exceeds a predefined third threshold; or
    a received signal strength indicator (RSSI) of an access point (AP) within an AP list provided by a serving eNB is less than a predefined fourth threshold,
    wherein the user preference setting includes whether a preferred WLAN is available.

2. The method of claim 1, wherein determining whether to transmit the WLAN measurement result by checking the set of rules comprises:
    determining to not transmit the WLAN measurement based on the rule of the set of rules being satisfied, wherein the rule of the set of rules comprises:
    a user preference setting restrains using a WLAN which corresponds to the WLAN measurement report.

3. The method of claim 1, wherein determining whether to transmit the WLAN measurement result by checking the set of rules comprises:
    determining to not transmit the WLAN measurement result based on the rule of the set of rules being satisfied, wherein the rule of the set of rules comprises:
    a WLAN module of the user equipment is unavailable.

4. The method of claim 1, wherein determining whether to transmit the WLAN measurement result by checking the set of rules comprises:
    determining to not transmit the WLAN measurement result based on the rule of the set of rules being satisfied, wherein the rule of the set of rules comprises:
    the UE is mobile within an access point (AP) list provided by a serving eNB.

5. The method of claim 1, wherein determining whether to transmit the WLAN measurement result by checking the set of rules comprises:

determining to transmit the WLAN measurement result based on the rule of the set of rules being satisfied, wherein the rule of the set of rules comprises:
a candidate access point (AP) is not within an AP list provided by a serving eNB.

6. The method of claim 1, wherein omitting the WLAN measurement result in the WLAN measurement report further comprising:
transmitting the response message comprising the WLAN measurement report, wherein the WLAN measurement report comprises a cause of the omitting the WLAN measurement result.

7. The method of claim 1, wherein the configuration message comprises an identifier (ID) of an access point of a WLAN which corresponds to the WLAN measurement report.

8. The method of claim 1, wherein the set of rules is inherent to the user equipment.

9. A user equipment comprising:
a transmitter;
a receiver;
a processor coupled to the transmitter and the receiver, wherein the processor is configured at least for:
receiving, via the receiver, a configuration message which provides or updates a set of rules;
determining whether to transmit a WLAN measurement result by checking the set of rules and a user preference setting after receiving the configuration message; and
generating a WLAN measurement report comprising the WLAN measurement result and transmitting, via the transmitter, a response message comprising the WLAN measurement report in response to having determined to transmit the WLAN measurement result based on the set of rules and the user preference setting, wherein a rule of the set of rules comprises:
a received signal strength indicator (RSSI) of an access point (AP) within an AP list provided by a serving eNB is less than a predefined second threshold and a received signal strength indicator (RSSI) of an access point (AP) not within an AP list provided by a serving eNB exceeds a predefined third threshold; or
a received signal strength indicator (RSSI) of an access point (AP) within an AP list provided by a serving eNB is less than a predefined fourth threshold,
wherein the user preference setting includes whether a preferred WLAN is available.

10. A method of controlling wireless local area network (WLAN) measurement report applicable to a base station, the method comprising:
transmitting a configuration message which provides or updates a set of rules;
receiving a response message comprising a WLAN measurement report which is based on checking the set of rules and a user preference setting after transmitting the configuration message, wherein a rule of the set of rules comprises:
a received signal strength indicator (RSSI) of an access point (AP) within an AP list provided by a serving eNB is less than a predefined second threshold and a received signal strength indicator (RSSI) of an access point (AP) not within an AP list provided by a serving eNB exceeds a predefined third threshold; or
a received signal strength indicator (RSSI) of an access point (AP) within an AP list provided by a serving eNB is less than a predefined fourth threshold;
determining whether to integrate a WLAN which corresponds to the WLAN measurement report in response to receiving the response message; and
transmitting a command message in response to having determined to integrate the WLAN,
wherein the user preference setting includes whether a preferred WLAN is available.

11. The method of claim 10, wherein receiving the response message further comprising:
a cause of omitting a WLAN measurement result in the WLAN measurement report.

12. The method of claim 10, wherein the configuration message comprises an identifier (ID) of an access point of a WLAN which corresponds to the WLAN measurement report.

13. The method of claim 10, wherein the set of rules comprises:
omitting a WLAN measurement result in the WLAN measurement report if a user preference setting restrains using the WLAN.

14. The method of claim 10, wherein the set of rules comprises:
omitting a WLAN measurement result in the WLAN measurement report if a WLAN module used to communicate with the WLAN is unavailable.

15. The method of claim 10, wherein the set of rules comprises:
omitting a WLAN measurement result in the WLAN measurement report if mobility is within an access point list (AP) provided by a serving eNB and transmitted from the base station.

16. The method of claim 10, wherein the set of rules comprises:
transmitting a WLAN measurement result in the WLAN measurement report if a candidate access point (AP) is not within an AP list provided by a serving eNB.

* * * * *